US008179537B2

(12) United States Patent
Kumagai

(10) Patent No.: US 8,179,537 B2
(45) Date of Patent: May 15, 2012

(54) IMAGE FORMING APPARATUS, PRINTING-MODE SETTING METHOD, AND PRINTER DRIVER

(75) Inventor: Takekazu Kumagai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 925 days.

(21) Appl. No.: 11/194,654

(22) Filed: Aug. 2, 2005

(65) Prior Publication Data

US 2006/0028669 A1 Feb. 9, 2006

(30) Foreign Application Priority Data

Aug. 5, 2004 (JP) ................ 2004-229769

(51) Int. Cl.
- G06F 3/12 (2006.01)
- G06F 7/00 (2006.01)
- G06F 12/00 (2006.01)
- H04N 1/00 (2006.01)
- H04N 1/46 (2006.01)

(52) U.S. Cl. ...... 358/1.13; 358/1.15; 358/401; 358/501; 707/706; 707/825

(58) Field of Classification Search .......... 358/1.13, 358/1.15, 1.9, 501, 508, 401; 715/234, 239, 715/760; 707/706, 825
See application file for complete search history.

(56) References Cited

U.S. PATENT DOCUMENTS

| 6,079,885 A * | 6/2000 | Sano ..................... 400/76 |
| 6,222,634 B1 * | 4/2001 | Dubbels et al. ......... 358/1.15 |
| 7,085,801 B1 * | 8/2006 | Abdelhadi et al. ....... 709/201 |
| 7,218,414 B2 | 5/2007 | Nakao ...................... 358/1.9 |
| 2002/0114002 A1 * | 8/2002 | Mitsubori et al. ........ 358/1.15 |
| 2003/0123079 A1 * | 7/2003 | Yamaguchi et al. ...... 358/1.15 |
| 2005/0219607 A1 | 10/2005 | Yamaguchi et al. ...... 358/1.15 |

FOREIGN PATENT DOCUMENTS

| JP | 11-134125 | 5/1999 |
| JP | 2002-223365 | 8/2002 |
| JP | 2003-169211 | 6/2003 |
| JP | 2003-280874 | 10/2003 |

OTHER PUBLICATIONS

Wikipedia Encyclopedia, Web Page, Jul. 29, 2004, Internet, p. 1-3.*
Small Planet Communication Inc., Create Your Own Web Page, 2000, Internet, all pages.*

* cited by examiner

*Primary Examiner* — Benny Q Tieu
*Assistant Examiner* — Ngon Nguyen
(74) *Attorney, Agent, or Firm* — Fitzpatrick, Cella, Harper & Scinto

(57) ABSTRACT

In an image forming apparatus enabling communication through a network and having a monochrome-printing mode and a color-printing mode, by, in a case where printing of a Web page downloaded through the network is instructed, determining whether or not there is any color image in the Web page, and by, if there is any color image, setting a printing mode for the Web page in accordance with information on the size of the image, whether color printing is printed or monochrome printing is implemented can be automatically determined in consideration of users' convenience.

13 Claims, 17 Drawing Sheets

F I G. 4
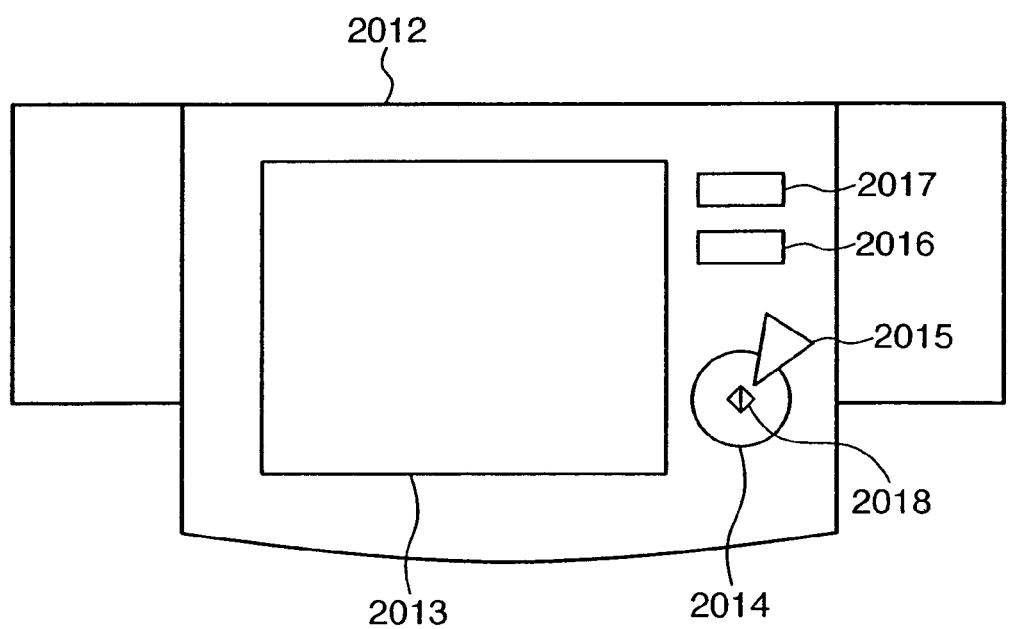

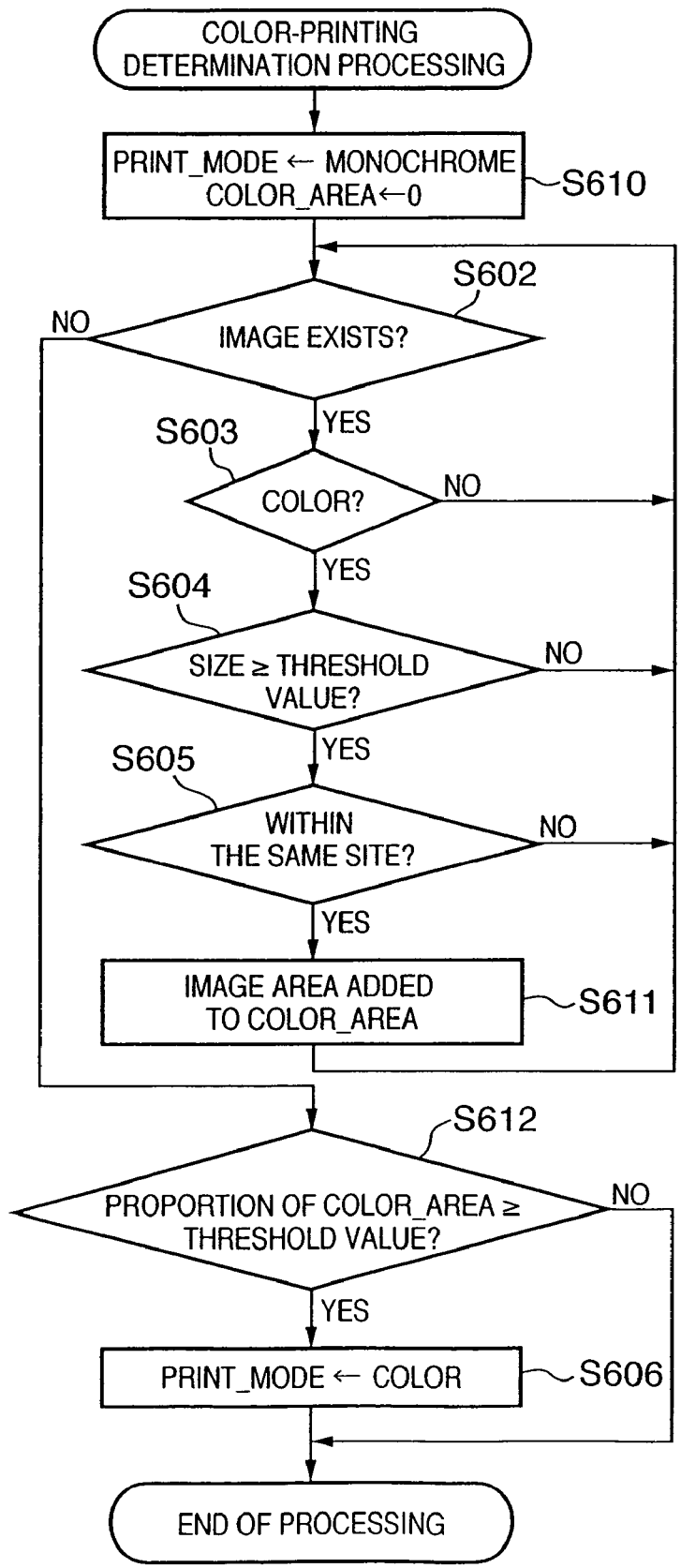

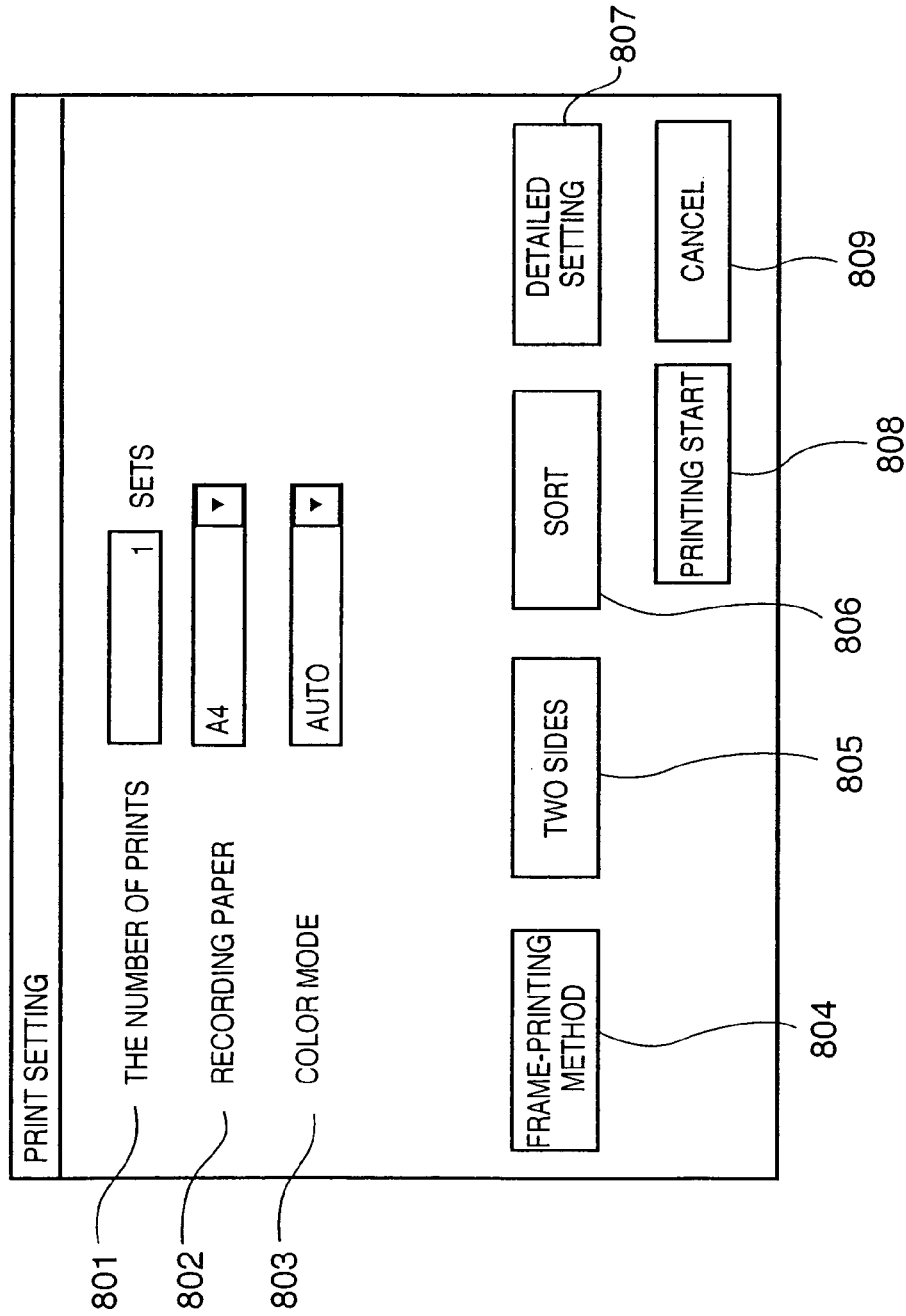

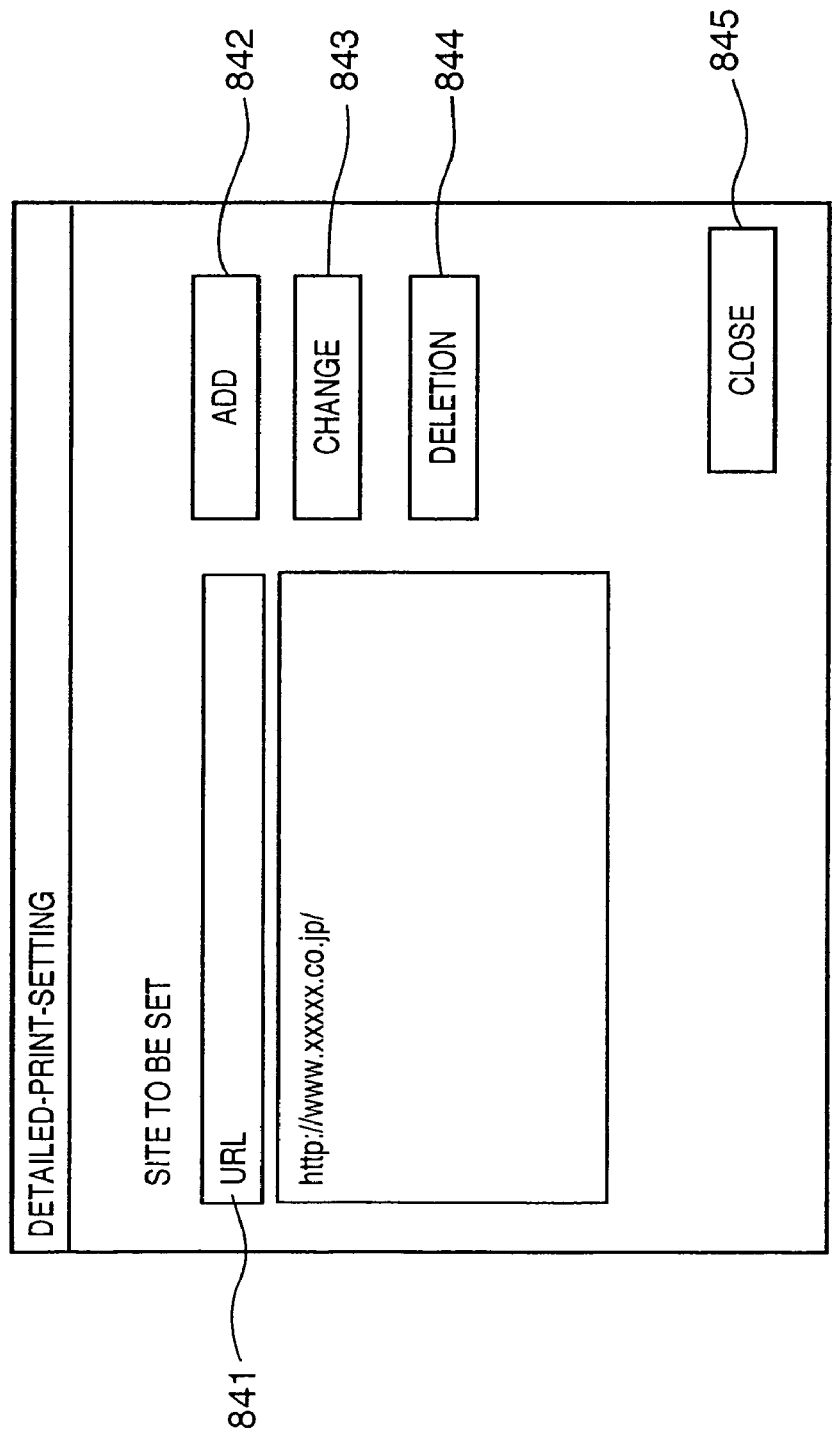

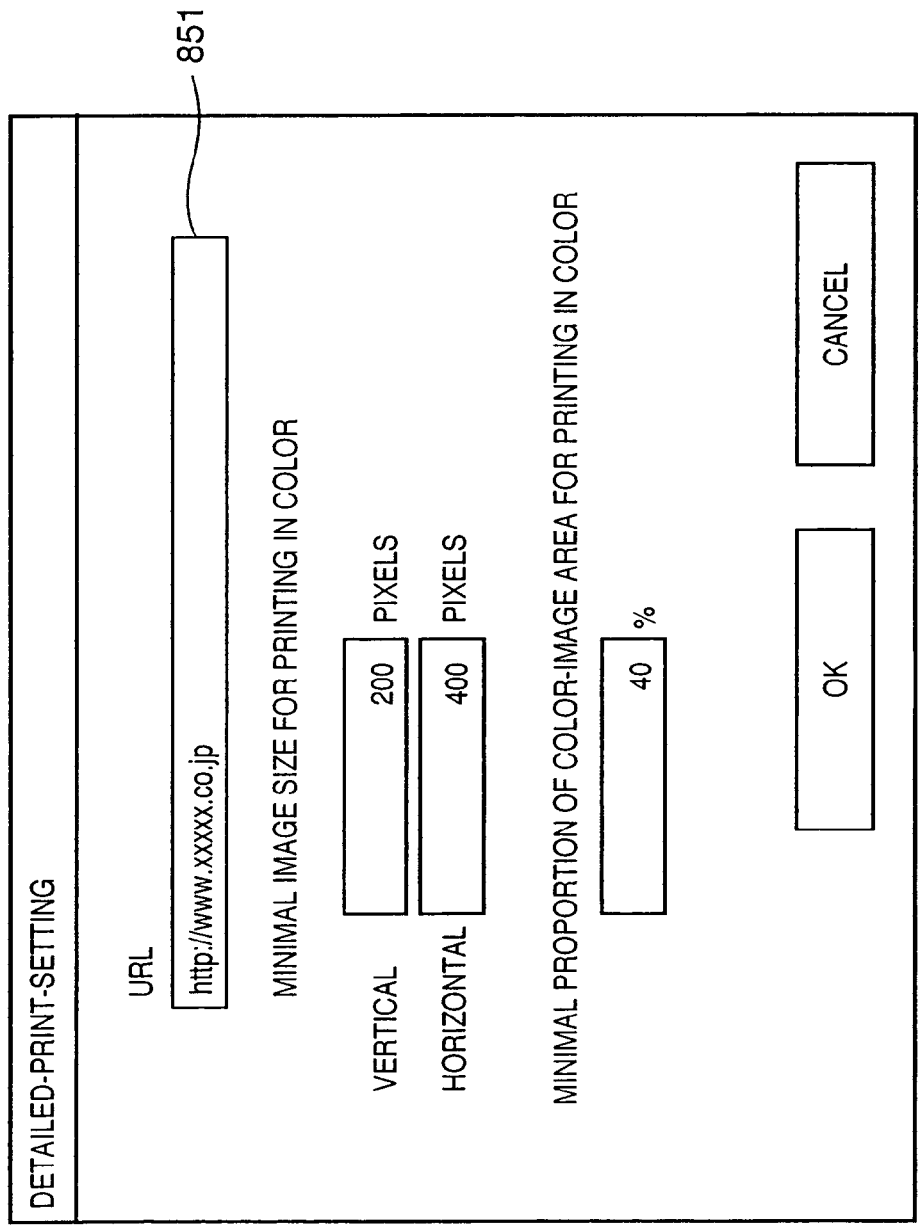

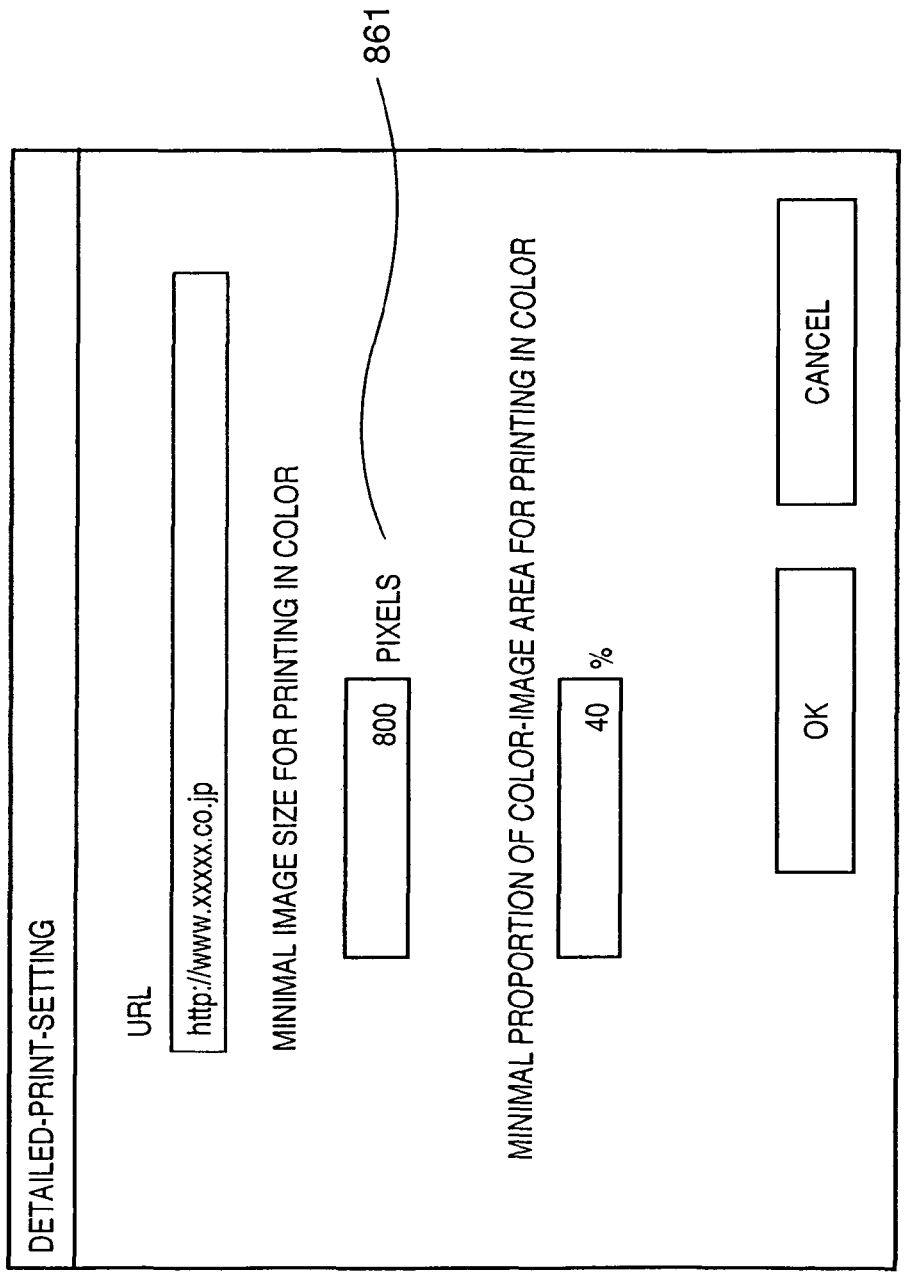

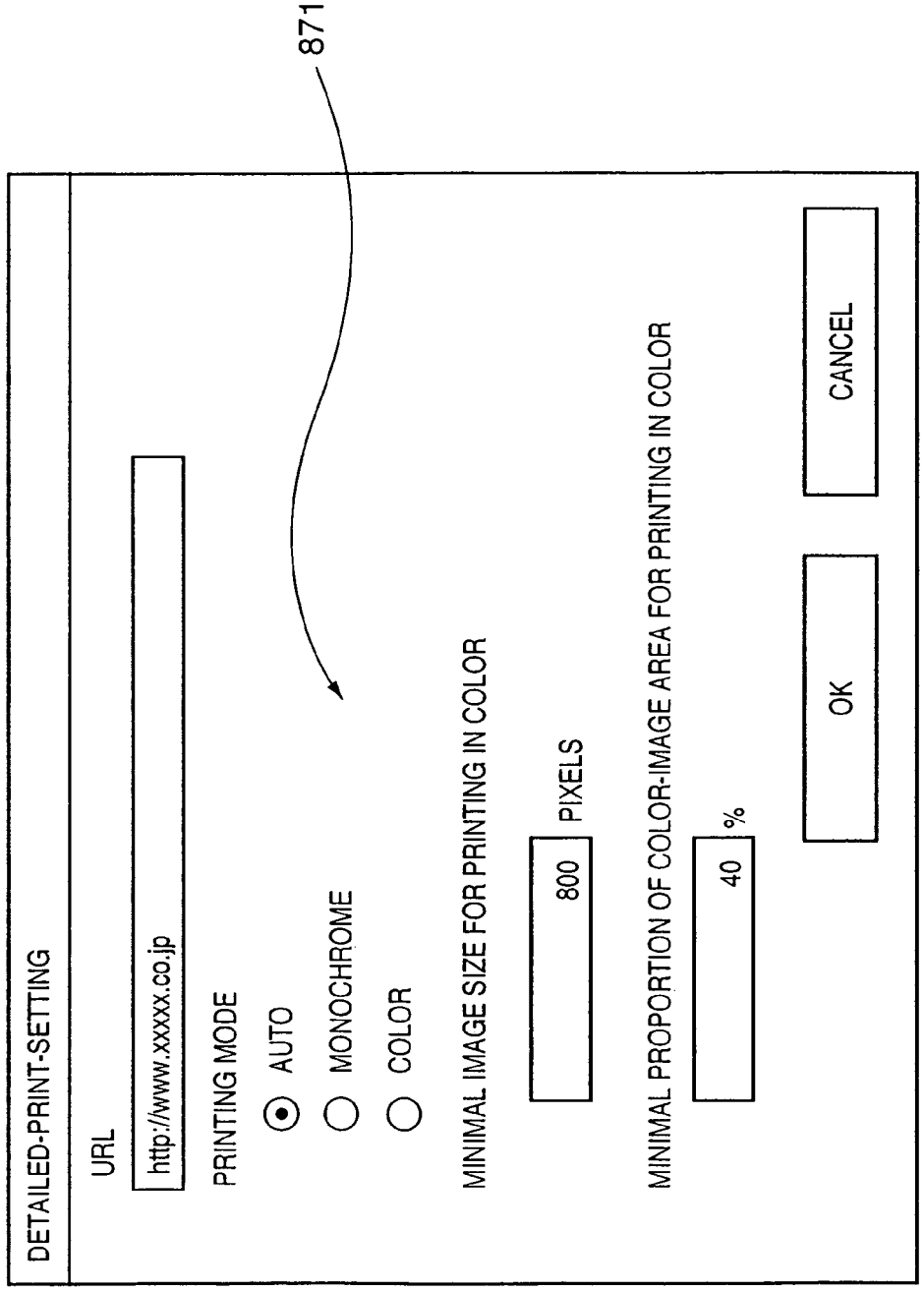

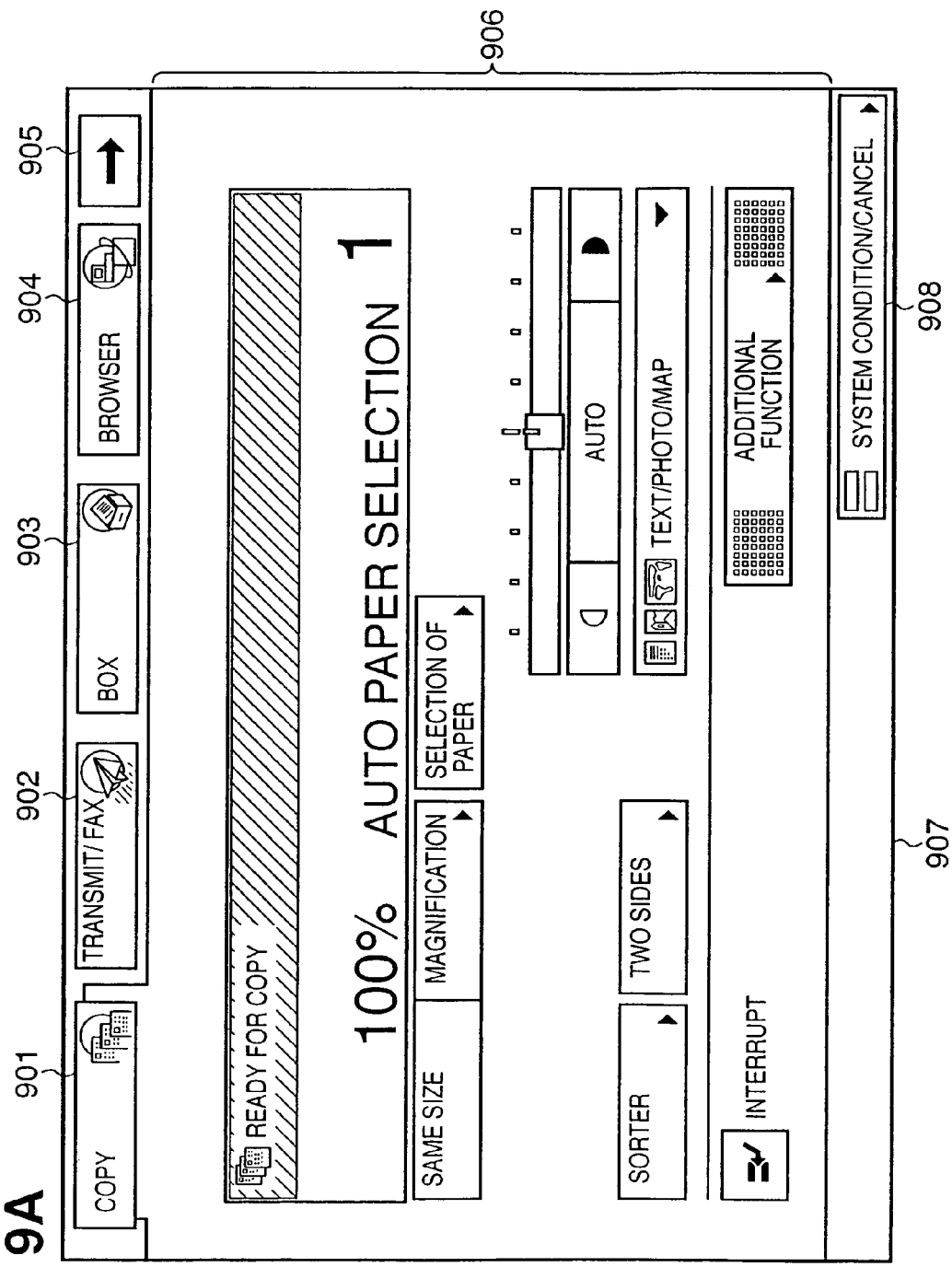

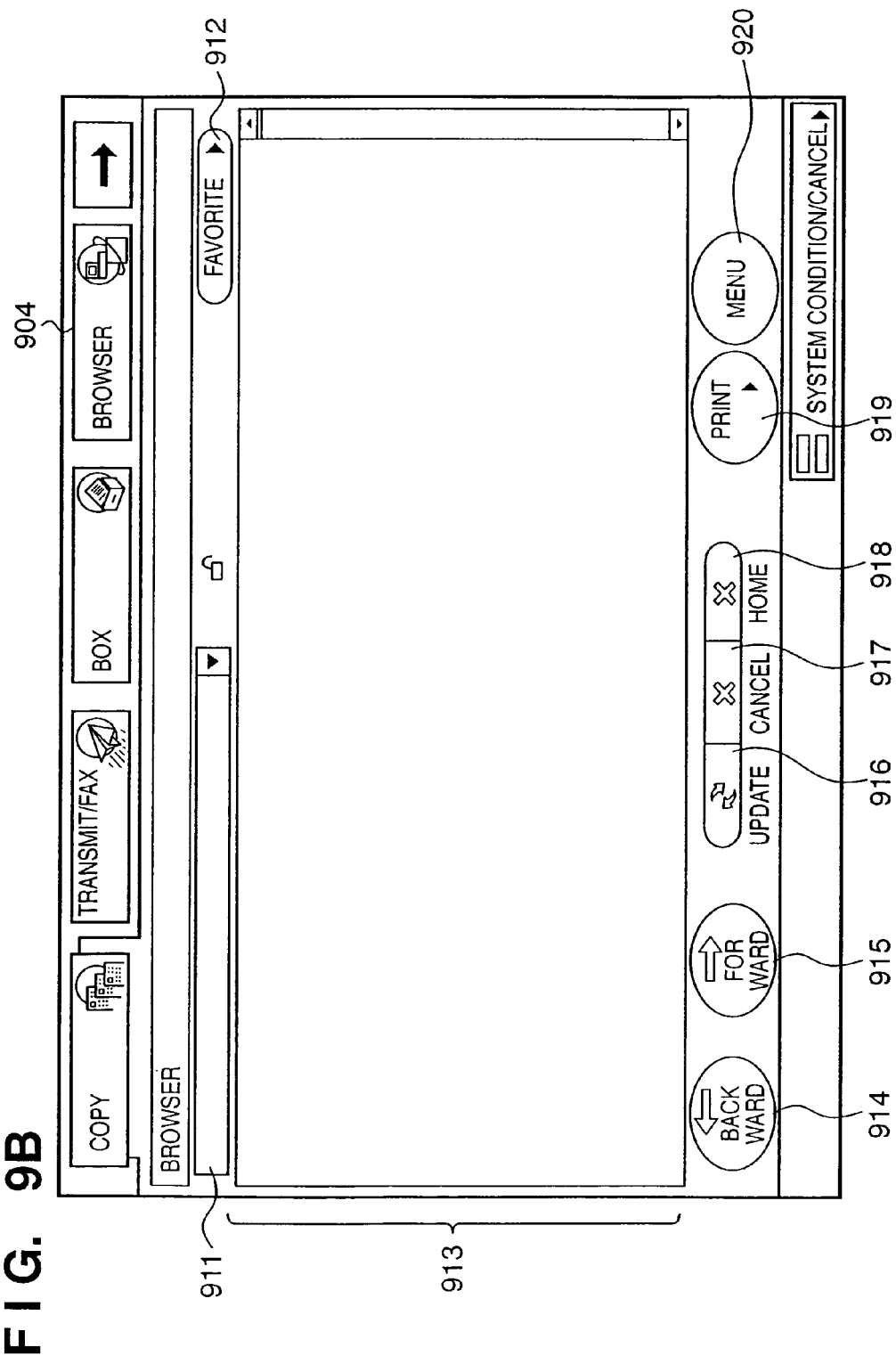

IMAGE FORMING APPARATUS, PRINTING-MODE SETTING METHOD, AND PRINTER DRIVER

FIELD OF THE INVENTION

The present invention relates to image forming apparatuses, printing-mode setting methods, and printer drivers, and more particularly, to processing for, in an image forming apparatus that enables communication through a network and printing in monochrome and color, automatically setting either monochrome printing or color printing in a case where printing of a Web page downloaded through a network is instructed.

BACKGROUND OF THE INVENTION

In recent years, multi-function peripherals (MFP), which are based on a digital copy machine and equipped with many additional functions, have been put to practical use. In other words, functions are added, such as implementing of facsimile communication, by utilizing a scanner and a printer that are inherently provided in a digital copy machine; by utilizing a printer, expanding code data sent from a computer to bit-mapped data and printing the bit-mapped data; by utilizing a scanner, uplinking an image read through the scanner to a network; and by utilizing a printer, printing an image distributed over a network.

The operation panel of a multi-function peripheral has become large-size; it is fully possible to implement not only operation and setting of functions utilizing a scanner and a printer, but also displaying for operation of remote apparatuses on the network and monitoring their conditions and displaying of Web pages through a browser, on the operation panel, and printing of Web pages through the operation panel (e.g., U.S. Patent Application Publication No. US-2003-123079, which corresponds to Japanese Patent Laid-Open No. 11-134125).

Compared with color printing, monochrome printing has an advantage, from the viewpoint of temporal costs and financial costs for printing. However, in the case where color images are included in the contents of a Web page, color printing is often desired.

However, a multi-function peripheral as described above is not designed to determine whether printing is made in monochrome or in color, in a case where a Web page displayed through a browser is printed; the determination is made regardless of the contents of the Web page, for example, in accordance with setting of the apparatus.

Accordingly, a case is caused in which a Web page is printed in color even though no color image exists therein, or in which a Web page is printed in monochrome even though many color images exist therein. In the former case, printing costs are wasted, and, in the latter case, it is required to change the setting to reprint the Web page; therefore, a disadvantage is posed to the user.

SUMMARY OF THE INVENTION

It is an object of the present invention to, in a case where a Web page is printed, make it possible to automatically determine whether printing is made in color or in monochrome, in consideration of users' convenience.

According to one aspect of the present invention, foregoing object is attained by an image forming apparatus enabling communication through a network and having a monochrome-printing mode and a color-printing mode, the image forming apparatus comprising: color-image determining unit for, in a case where printing of a Web page downloaded through the network is instructed, determining whether or not there is any color image in the Web page; and printing-mode setting unit for, if there is any color image, setting a printing mode for the Web page in accordance with information on the size of the image.

According to another aspect of the present invention, the foregoing object is attained by a printing-mode setting method for an image forming apparatus enabling communication through a network and having a monochrome-printing mode and a color-printing mode, the printing-mode setting method comprising: a color-image determining step of, in a case where printing of a Web page downloaded through the network is instructed, determining whether or not there is any color image in the Web page; and a printing-mode setting step of, if there is any color image, setting a printing mode for the Web page in accordance with information on the size of the image.

In other words, the present invention enables communication through a network; in an image forming apparatus having a monochrome-printing mode and a color-printing mode, in a case where printing of a Web page downloaded through the network is instructed, whether or not there is any color image in the Web page is determined; if there is any color image, the printing mode for the Web page is determined in accordance with information on the size of the color image.

Accordingly, it is possible that the printing mode is set to the color-printing mode, for example, only if the size of a color image or the area proportion (ratio) of color images, in a Web page, is a predetermined setting value or larger.

Therefore, it is possible to carry out monochrome printing in priority to color printing, in consideration of users' convenience, whereby temporal and financial costs for printing can be reduced.

The printing-mode setting unit may include size determining unit for determining whether or not the information on the size of an image is the same as, or lager than, a predetermined setting value; and wherein if the size determining unit determines that the information on the size of an image is the same as, or lager than, a predetermined setting value, the printing mode may be set to the color-printing mode, otherwise, the printing mode may be set to the monochrome-printing mode.

The printing-mode setting unit may include the size determining unit for determining whether or not the information on the size of an image is the same as, or lager than, the predetermined setting value, and storing-location determining unit for, if the size determining unit determines that the information on the size of an image is the same as, or lager than, the predetermined setting value, determining whether a location where the image is stored is within a web site for the Web page; and wherein the storing-location determining unit determines that the location where the image is stored is within the web site for the Web page, the printing-mode setting unit may set the printing mode for the Web page to the color-printing mode, otherwise, the printing-mode setting unit sets the printing mode for the Web page to the monochrome-printing mode.

The information on the size of an image may include at least either one of the vertical and horizontal sizes of the color image, the proportion, to the area of the Web page, of the aggregate area of color images whose at least either one of vertical and horizontal sizes is the same as, or lager than, and a predetermined setting value, among color images that are within the Web page.

The predetermined setting value may be changed by a user, and maybe changed for each of web sites.

Preferably, the Web page is described in a markup language, the network is the Internet, and the markup language is HTML.

The apparatus may further comprise displaying unit for displaying various types of information for a user and a browser for making the displaying unit display the Web page.

The image forming apparatus may be a multi-function peripheral having a copy function, a scanner function, and a facsimile function.

Moreover, the present invention can be applied to a printer driver that is installed in a computer having a function of communicating through a network, a display, and a browser for displaying a Web page on the display, and that outputs control data and image data to an image forming apparatus that can implement monochrome printing and color printing.

Still moreover, a computer program that makes a computer system carry out the foregoing printing-mode setting method and a memory medium storing the computer program achieve the object described above.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is an external view illustrating the configuration of a operation unit 2012;

FIG. 6B is a flowchart illustrating monochrome/color determination processing of Second Embodiment;

FIG. 8A is a view illustrating an example of a print-setting display displayed on a operation unit;

FIG. 8D is a view illustrating an example of a detailed-print-setting display displayed on a operation unit in Third Embodiment;

FIG. 8E is a view illustrating an example of a detailed-print-setting display displayed on a operation unit in Third Embodiment;

FIG. 8F is a view illustrating an example of a detailed-print-setting display displayed on a operation unit in Fifth Embodiment;

FIG. 8G is a view illustrating an example of a detailed-print-setting display displayed on a operation unit in Sixth Embodiment;

FIG. 9A is a view illustrating an example of an initial display for a copy function, displayed on a operation unit; and FIG. 9B is a view illustrating an example of a browser-initiating display displayed on a operation unit.

DETAILED DESCRIPTION OF THE PREFERRED EMBODIMENTS

Preferred embodiments of the present invention will now be described in detail in accordance with the accompanying drawings. Note that each elements in the following embodiments is not intended to limit the scope of the invention, but is described only as an example.

First Embodiment

Hereinafter, First Embodiment of a multi-function peripheral according to the present invention will be described, referring to the accompanying drawings.

Figure 1:
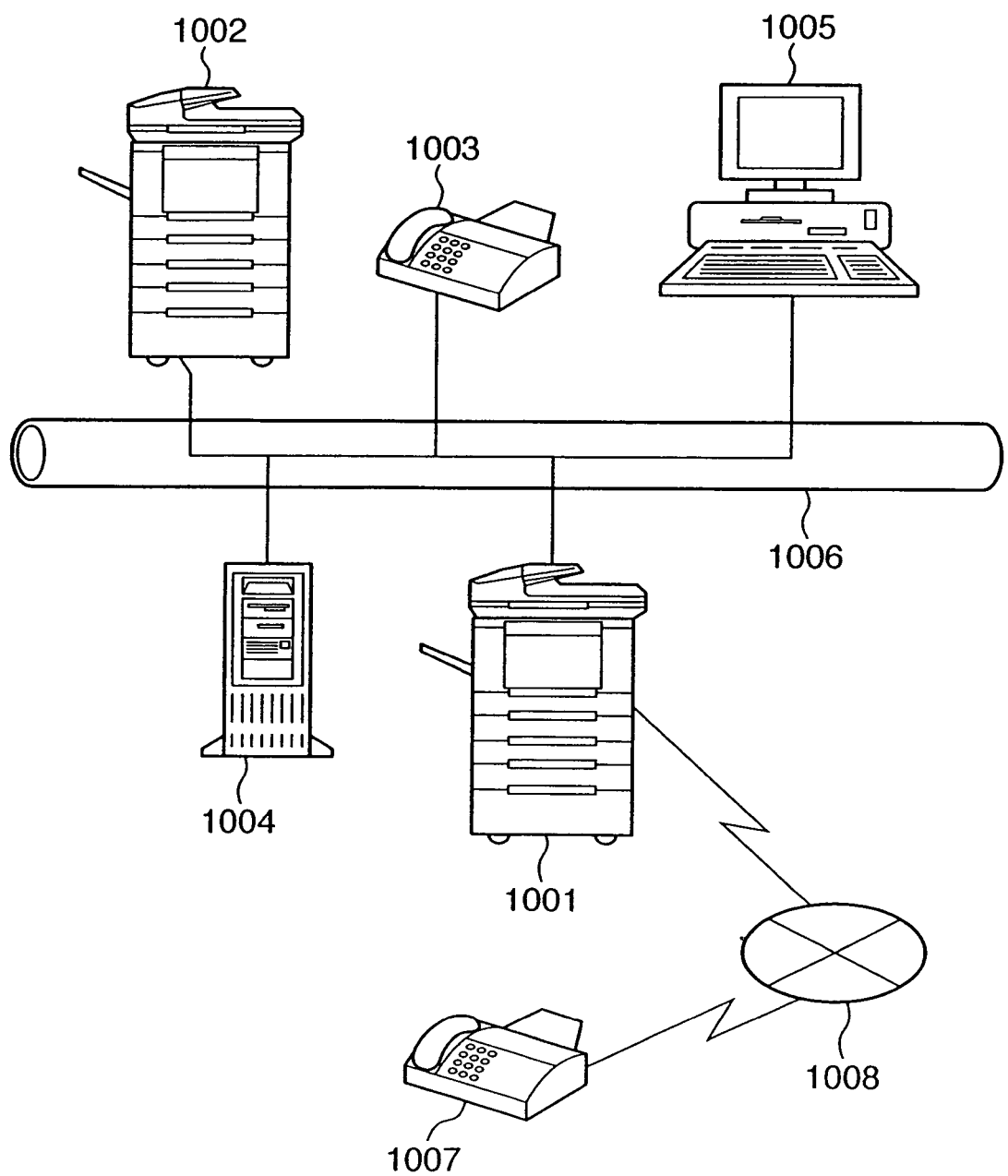
FIG. 1 is a view schematically illustrating a network configuration including a multi-function peripheral according to one embodiment of the present invention.

FIG. 1 is a view schematically illustrating a network configuration including a multi-function peripheral as an image forming apparatus according to one embodiment of the present invention. In First Embodiment, the case will be explained in which the multi-function peripheral is a copy machine having a function of sending data.

<Network Configuration>

As illustrated in FIG. 1, a copy machine 1001 is connected to a LAN (Local Area Network) 1006 made up of Ethernet™ and the like, along with a copy machine 1002 having functions identical to those of the copy machine 1001, a facsimile machine 1003, a database/mail server 1004, and a client computer 1005. The copy machine 1001 is connected also to a Public Switched Telephone Network 1008, along with a facsimile machine 1007.

The copy machine 1001 has a copy function, a facsimile function, and a data sending function of reading out a document image and sending the read image data to each of apparatuses on the LAN 1006. In addition, because the copy machine 1001 has a PDL (Page Description language) function, it can receive a PDL data instructed by a computer connected to the LAN 1006, and print the received data by converting the data into image data.

Moreover, the copy machine 1001 can store in a box region of an internal hard disk 2004 described later an image read out by the copy machine 1001 and a PDL data instructed by a computer connected to the LAN 1006 and can print images the stored images.

Furthermore, the copy machine 1001 can receive through the LAN 1006 data read out by the copy machine 1002, can store the received data in the hard disk 2004 in the copy machine 1001, and can print the stored data. In addition, the copy machine 1001 can receive through the client computer 1005 and the LAN 1006 an image from the database server 1004, can store the received image in the copy machine 1001, and can print the stored image.

The copy machine 1001 is equipped with a Web browser application; the copy machine 1001 can display, can store therein, and can print a Web page, described in a markup language such as HTML (Hyper Text Markup Language), that is obtained through the LAN 1006 from the WWW (World Wide Web).

The facsimile machine 1003 can receive through the LAN 1006 data read out by the copy machine 1001 and can send the received data.

The database/mail server 1004 is a server system having functions of receiving through the LAN 1006 data read out by the copy machine 1001, of storing the received data in a database, and of sending the stored data as a piece of e-mail.

The client computer 1005 is connected to the database/mail server 1004; the client computer 1005 can receive and display desired data obtained from the database/mail server 1004, can receive through the LAN 1006 data read out by the copy machine 1001, and can process and edit the received data.

The facsimile machine 1007 can transmit through the Public Switched Telephone Network 1008 image data read out from a document, can receive and print image data, can receive data read out by the copy machine 1001, and can print the received data.

<Principal Configuration>

Figure 2:
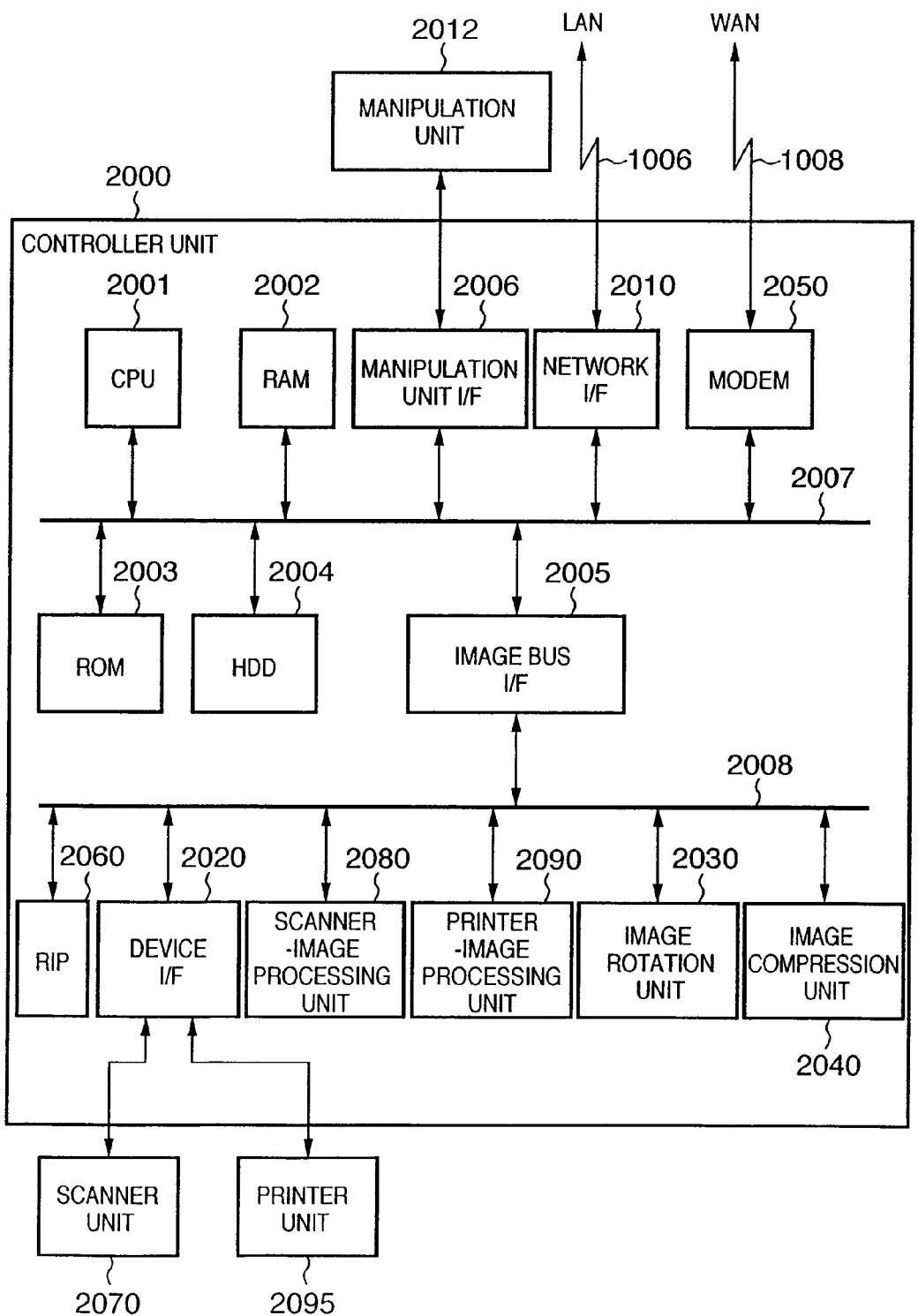
FIG. 2 is a block diagram illustrating a configuration of principal parts of a copy machine 1001 according to First Embodiment.

FIG. 2 is a block diagram illustrating a configuration of principal parts of the copy machine 1001 according to First Embodiment.

The controller unit 2000 is connected to a scanner 2070 as an image inputting device and a printer 2095 as an image outputting device; the controller unit 2000 carries out control for realizing a copy function of printing with the printer 2095 data read out by the scanner 2070 and carries out control for inputting and outputting image information and device information, by being connected to the LAN 1006 and a WAN 1008 such as a Public Switched Telephone Network.

Specifically, the controller unit 2000 has a CPU (Central Processing Unit) 2001; the CPU 2001 boots an operation system (OS) by means of a boot program stored in a ROM (Read Only Memory) 2003 and implements various types of processing, while carrying out on the OS application programs stored in a HDD (hard disk drive) 2004. As a work area of the CPU 2001, a RAM 2002 is utilized. The RAM 2002 provides the work area and an image memory for temporarily storing image data. The HDD 2004 stores the foregoing application programs and various types of data including image data. A Web browser described later is installed as an application program in the controller unit 2000. CPU 2001 can realize a Web browsing function by executing the Web browser program stored in the HDD 2004 or the ROM 2003, with using the RAM 2002 as a work area.

Along with the ROM 2003 and the RAM 2002, a operation unit I/F (operation unit interface) 2006, a network I/F (network interface) 2010, a modem 2050, and an image bus I/F (image interface) 2005 are connected through a system bus 2007 to the CPU 2001.

The operation unit I/F 2006 is an interface between the CPU 2001 and a operation unit 2012 having a touch panel and outputs to the operation unit 2012 image data to be displayed on the operation unit 2012. The operation unit I/F 2006 also sends out to the CPU 2001 information that is inputted through the operation unit 2012 by the user.

Next, the network I/F 2010 is connected to the LAN 1006 and, through the LAN 1006, outputs or inputs information to or from each of apparatuses on the LAN 1006. The modem 2050 is connected to the Public Switched Telephone Network 1008 and outputs and inputs information, through the Public Switched Telephone Network 1008.

The image bus I/F 2005 is a bus bridge for connecting the system bus 2007 with an image bus 2008 that transfers image data at high speed and for converting data structure. The image bus 2008 consists of a PCI (Peripheral Component Interconnect) bus or IEEE (the Institute of Electrical and Electronic Engineers) 1394. A raster image processor (referred to as a RIP, hereinafter) 2060, a device I/F 2020, a scanner-image processing unit 2080, a printer-image processing unit 2090, an image rotation unit 2030, and an image compression unit 2040 are provided on the image bus 2008.

The RIP 2060 is a processor for expanding PDL codes to a bit-mapped image. The scanner 2070 and the printer 2095 are connected to the device I/F 2020 that implements synchronous system/asynchronous system conversion of image data. The scanner-image processing unit 2080 corrects, processes, and edits input image data. The printer-image processing unit 2090 implements correction, resolution-conversion, and the like, of print-output image data, in accordance with setting on the printer. The image rotation unit 2030 rotates image data. The image compression unit 2040 compresses multilevel image data into JPEG (Joint Photographic Coding Experts Group) data and binary format image into data in various formats such as JBIG (Joint Bi-level Image experts Group), MMR (Modified Modified Read), and MH (Modified Huffman), and implements expansion processing of the compressed data.

<Hardware Configuration>

Figure 3:
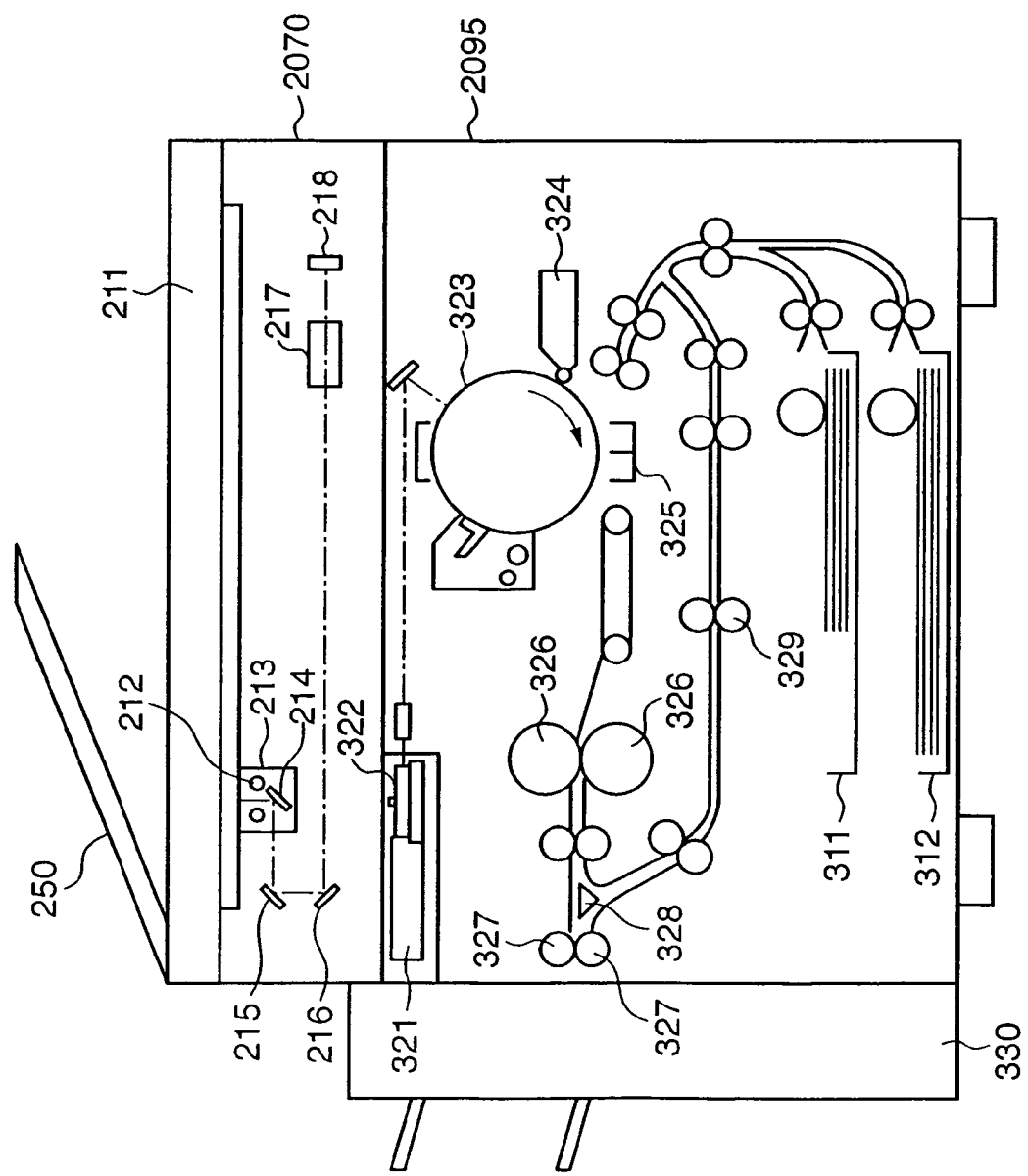
FIG. 3 is a view schematically illustrating a hardware configuration of the scanner unit and the printer unit of the copy machine 1001 in FIG. 1.

FIG. 3 is a view schematically illustrating a hardware configuration of the scanner unit 2070 and the printer unit 2095, illustrated in FIG. 2, of the copy machine 1001 in FIG. 1.

As illustrated in FIG. 3, the scanner unit 2070 and the printer unit 2095 are integrally configured. The scanner unit 2070 is equipped with a document feeding unit 250 that transports documents onto a platen glass 211, one by one from the foremost sheet. Every time reading operation for each document is completed, the document is discharged from the platen glass 211 to a discharge tray (unillustrated). When the document has been transported onto the platen glass 211, the scanner unit 2070 lights a lamp 212 and then starts a traveling unit 213 traveling. The traveling of the traveling unit 213 initiates read scanning of the document on the platen glass 211. During the read scanning, the reflected light from the document is introduced to a CCD image sensor (referred to as a CCD, hereinafter) 218, by way of mirrors 214, 215, and 215 and a lens 217, whereby the image on the document is formed onto the image pickup plane of the CCD 218. The CCD 218 converts the image formed on the image pickup plane into an electric signal that is inputted to the controller unit 2000 after a predetermined processing is applied to the electric signal.

The printer unit 2095 has a laser driver 321 that drives a laser luminescence unit 322, based on the image data inputted from the controller unit 2000. Accordingly, the laser luminescence unit 322 produces a laser beam, in accordance with the image data; the laser beam is irradiated onto a photoconductive drum 323, while being scanned. An electro-static latent image is formed through the irradiated laser beam on the photoconductive drum 323; the electro-static latent image is visualized, as a toner image, with toner supplied by a developing device 324. In synchronization with the irradiation timing of the laser beam, a sheet of recording paper is fed, by way of the transport path, from a cassette 311 or 312 to the place between the photoconductive drum 323 and a transfer unit 325; the toner image on the photoconductive drum 323 is transferred by the transfer unit 325 onto the fed recording paper.

The recording paper onto which the toner image has been transferred is transported by way of the transport belt to a pair of fixing rollers (a heating roller and a pressure roller) 326; the pair of fixing rollers 326 applies heat and pressure to the recording paper to fix the toner image on the recording paper. The recording paper that has passed through the pair of fixing rollers 326 is discharged by a pair of discharging rollers 327 to a paper-discharge unit 330. The paper-discharge unit 330 consists of a sheet processing device that enables post-processing such as sorting and stapling. In addition, in the case where a two-side recording mode is set, the recording paper is transported to the pair of discharging rollers 327; the rotating direction of the pair of discharging rollers 327 is reversed; and the recording paper is introduced by a flapper 328 to a re-feeding transport path 329. The recording paper that has been introduced to the re-feeding transport path 329 is re-fed at the timing described above to the place between the photoconductive drum 323 and the transfer unit 325; the toner image is transferred onto the back side of the recording paper.

In addition, in FIG. 3, for the sake of brevity, only a single set of the photoconductive drum 323 and the developing device 324 is illustrated; however, the multi-function peripheral according to First Embodiment enables color printing; the multi-function peripheral is configured so that color printing, for example, with four types of toner, i.e., cyan, magenta, yellow, and black, is enabled by either the four-cycle method or by the tandem method.

<Appearance of Operation Unit>

Next, the configuration of the operation unit 2012 will be explained, referring to an external view in FIG. 4. A LCD (Liquid Crystal Display) display unit 2013, on the LCD of which a touch-panel sheet is attached, displays operation display and the like, described later, of the system, and, when a displayed key is depressed, conveys to the controller CPU 2001 the positional information of the key. A start key 2014 is utilized, for example, when initiating the reading operation for a document image. In the central portion of the start key 2014, a pair of LEDs 2018 having two colors, i.e., green and red; the colors indicate whether or not the multi-function peripheral is in the state in which the start key is enabled to be used. A stop key 2015 functions to halt actions in operation. An ID key 2016 is utilized to input the user ID (identifier) of a user. A reset key 2017 is utilized to initialize setting through the operation unit.

<Display of Operation Unit>

Examples of operation display displayed on the operation unit 2012 will be explained, referring to FIGS. 9A and 9B.

As illustrated in FIG. 9A, a plurality of touch keys displayed as tabs for respective functions, such as "Copy" 901, "Transmit/Fax" 902, "Box" 903, and "Browser" 904, are displayed on the top portion of the operation unit. A program for Web-browser display is incorporated in the ROM 2003 in the controller unit 2000; Web-browser display is enabled by an instruction through the operation unit 2012.

In the case where five or more functions are provided in the controller 2000, on the right side of the four function tabs 901 through 904, i.e., "Copy", "Transmit/Fax", "Box", and "Browser", a right-arrow key 905 for displaying other function tabs is displayed.

In FIG. 9A, the initial display for the copy function, in the case where the "Copy" touch key 901 is depressed, is represented. The region enclosed by a boundary line 906 relates to the copy function; in the order from the upper portion in FIG. 9A, in a region displaying a message "Ready for Copy", status messages for the copy function are displayed, and a region for displaying "Magnification", "Selected paper-feeding tray", and "Number of Copies" are situated thereunder. In addition, as touch keys for setting operation modes in the copy function, a "Same Size" key, a "Magnification" key, a "Selection of Paper" key, a "Sorter" key, a "Two Sides" key, an "Interrupt" key, a "Character" key, a density-adjusting left-arrow key corresponding to decreasing the density of printing, a density-adjusting right-arrow key corresponding to increasing the density of printing, and a "Auto" key for automatically adjusting the density are displayed; with regard to designation of operation modes that can no more be displayed on the initial display, setting displays are displayed layer by layer in the region 906, by depressing an "Additional Function" key.

A display region 907 is a region for displaying the status of the copy machine 1001, for example, an alarm message for paper jamming or the like and a status massage, indicating, when PDL printing is being carried out, that PDL printing is in process, are displayed in the display region 907.

When a "System condition/Cancel" touch key 908 is depressed, a display for displaying information on devices of the copy machine 1001 or a display for displaying the situation of a printing job is displayed (unillustrated); a printing job can be cancelled with this display.

When the "Transmit/Fax" key 902 is depressed, a setting display is displayed (unillustrated) for sending (FTP transfer), as a piece of e-mail, to an apparatus on the LAN 1006, or for sending as a facsimile through the Public Switched Telephone Network 1008, an image read out by the copy machine 1001.

When the "Box" key 903 is depressed, a setting display is displayed (unillustrated) for storing in the box region of the hard disk 2004 an image read out by the copy machine 1001, or for printing or sending to an apparatus on the LAN 1006 the stored image data.

When the "Browser" key 904 is depressed, a browser-initiating display illustrated in FIG. 9B is displayed.

In the browser-initiating display in FIG. 9B, with a URL (Uniform Resource Locator) being specified, a field, i.e., a URL input portion 911 is depressed to display a Web page. The administrator may by his authority configure the Web browser in such a way that depressing the URL input portion 911 makes a software keyboard be displayed and enables the user to specify a URL.

Depressing a "Favorite" key 912 enables registration, arrangement, and display of desired URLs. A display region 913 is for displaying the contents of a specified Web page. A "Backward" key 914 is to return a Web page to the immediately previous page. A "Forward" key 915 is to make a Web page proceed to the next page.

An "Update" key 916 is to reload and display the current Web page. A "Cancel" key 917 is to cancel reading of a Web page. A "Home" key 918 is to make movement from the current Web page to a preset home page.

A "Print" key 919 is to print the current Web page. When the "Print" key 919 is depressed, a print-setting dialogue as illustrated in FIG. 9A is displayed. In the print-setting dialogue, a display for setting a method of printing frame and for setting items related to printing (such as "Number of prints", "two sides", "sorting", and "Color mode") are displayed; depressing a "print start" button in the display initiates printing.

A "Menu" key 920 is to display a display for changing display magnification of the display, character sizes, and character codes.

<Print-Setting Display>

In the browser-initiating display in FIG. 9B, when the "Print" key 919 is depressed, a print-setting display as illustrated in FIG. 8A is displayed.

Reference numeral 801 denotes a region for setting the number of prints, i.e., a region (dialogue box) to which the user inputs the number of prints; "1" is set by default.

Reference numeral 802 denotes a dialogue box for setting the size of recording paper; by selecting from a pull-down menu that is displayed by depressing the right-hand key, the user selects and sets the size of recording paper to be used for printing.

Reference numeral 803 denotes a color-mode-setting dialogue box; by selecting from a pull-down menu that is displayed by depressing the right-hand key, the user sets one out of the monochrome printing mode, the color printing mode, and the automatic-determination mode.

When a frame-setting button 804 is depressed, an unillustrated frame-setting display is displayed; with regard to a method of printing a frame, it is possible to select one out of "Print as displayed", "Print a currently selected frame only", and "Print all the frames one by one". When a "Two sides" button 805 is depressed, an unillustrated two-side printing setting display is displayed; it is possible to set whether or not the two-side printing is carried our. When a "Sort" button 806 is depressed, an unillustrated sorting setting display is displayed; it is possible to implement setting related to sorting such as "Group Sort" and "Page Sort".

Figure 8B:
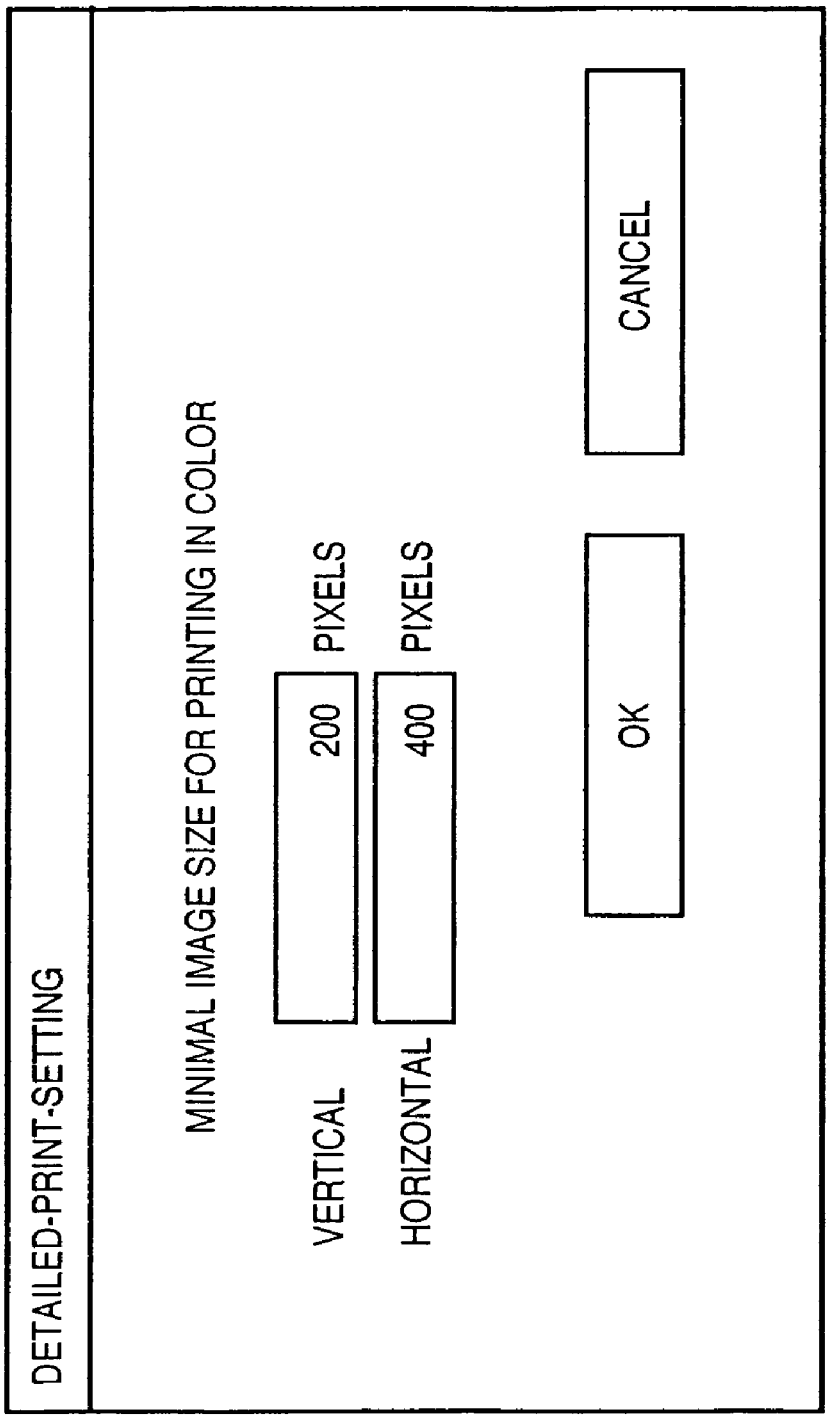
FIG. 8B is a view illustrating an example of a detailed-print-setting display displayed on a operation unit in First Embodiment.

When a "Detailed Setting" button 807 is depressed, a detailed-print-setting display as illustrated in FIG. 8B is displayed. In the detailed-print-setting display, it is possible to set "Minimal image size for printing in color" as an image-size threshold value for determining whether or not color printing is carried out, with independent dialogue boxes for the number of vertical-direction pixels and the number of horizontal-direction pixels, respectively.

Figure 5:
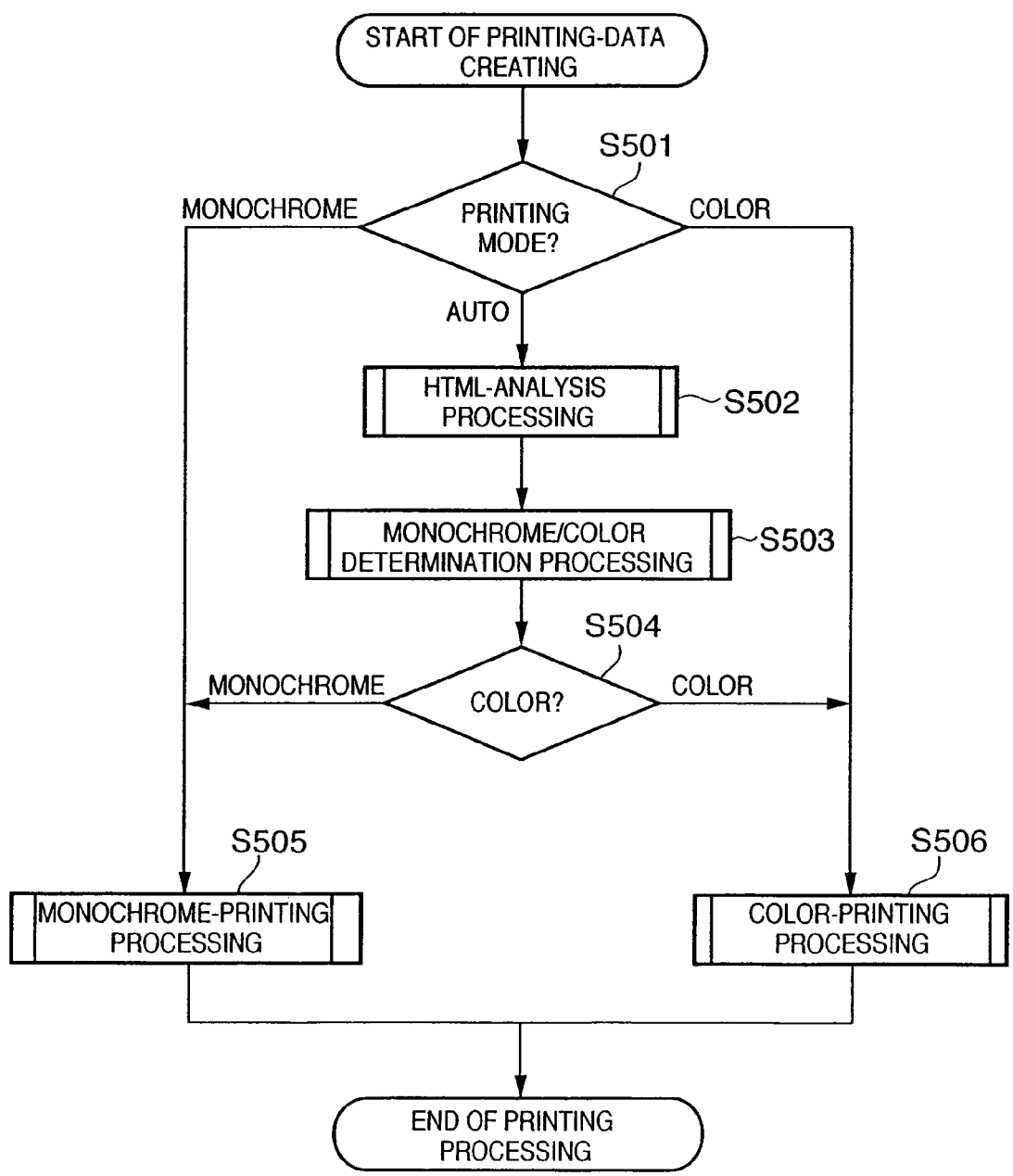
FIG. 5 is a flowchart illustrating processing for creating printing data from a Web page displayed on the browser display.

When a "Print Start" button 808 is depressed, printing in accordance with the setting is started, and processing, as described later related to FIG. 5, is started. When a "Cancel" button 809 is depressed, printing is cancelled, and the display returns to the original browser display (in FIG. 9B).

<Printing-Data Creating Processing>

FIG. 5 is a flowchart illustrating processing for creating printing data based on a Web page displayed on the browser display.

In the first place, in the step S501, the color mode that has been set in the color-mode-setting dialogue box 803 in the print-setting display is read out; the processing is ramified in accordance with the setting. In the case where monochrome printing has been set, the processing proceeds to S505 where monochrome-printing processing is implemented; in the case where color printing has been set, the processing proceeds to S506 where color-printing processing is implemented. Meanwhile, in the case where automatic-determination mode has been set, the processing proceeds to S502 for HTML-analysis processing. The HTML-analysis processing will be explained separately, with reference to FIG. 7.

After the HTML-analysis processing in S502 is completed, the processing proceeds to S503 for monochrome/color determination processing, which is processing for determining whether monochrome printing is implemented or color printing is implemented; the details will be explained separately, with reference to FIG. 6A.

In S504, the determination result of the monochrome/color determination processing in S503 is referred to; in the case where the result of the determination indicates monochrome printing, the processing proceeds to the monochrome-printing processing in S505 where the monochrome-printing processing is implemented; in the case where the result of the determination indicates color printing, the color-printing processing in S506 is implemented.

<Monochrome/Color Determination Processing>

Figure 6A:
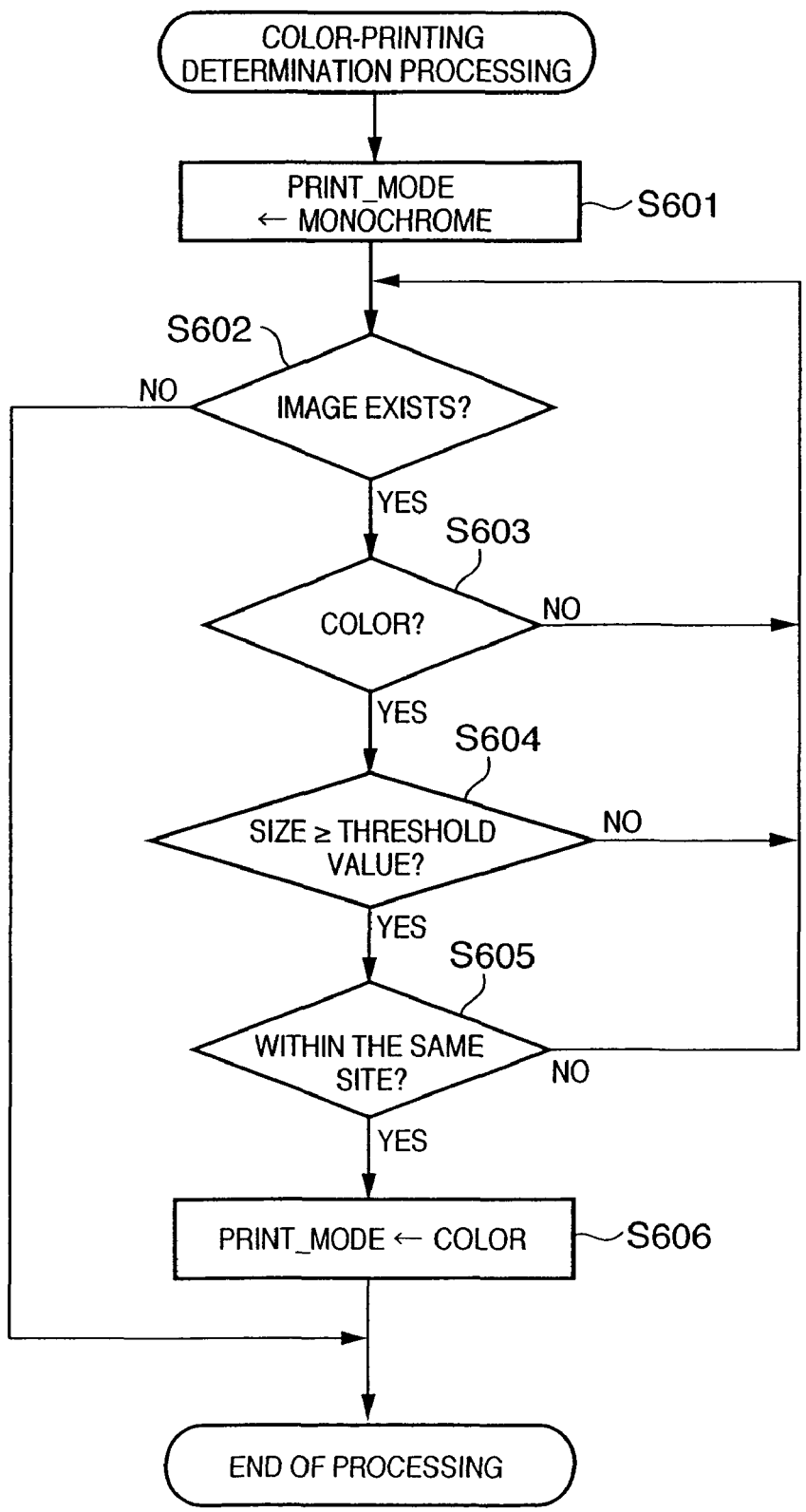
FIG. 6A is a flowchart illustrating monochrome/color determination processing of First Embodiment.

FIG. 6A is a flowchart for explaining the monochrome/color determination processing (S503) for determining whether monochrome printing is implemented or color printing is implemented.

In S601, a variable "PRINT_MODE" that is utilized for the processing is initialized to "monochrome" that denotes implementation of monochrome printing.

In S602, referring to the result of the HTML-analysis processing, it is determined whether or not there is an image element (image data) that is represented by means of an <img> tag in HTML. If an image element is identified, with regard to the first image element, the processing proceeds to S603; otherwise, the processing ends without doing anything. In addition, in the case where the processing returns from other processing to S602, whether or not there is any image element that has not been made to be the subject is determined; if there is any image element that has not been made to be the subject, in accordance with a predetermined order (in emerging order of tags or in alphabetical order), an image element is determined that is made to be the subject for the following processing (S603 through S605).

In S603, by obtaining an image file to which the image element refers, it is determined whether the file is for a monochrome image or the file is for a color image. If the result of the determination indicates that the file is for a color image, the processing proceeds to S604; if the result of the determination indicates that the file is for a monochrome image, the processing returns to S602. As discussed above, in First Embodiment, it is determined that it is of no advantage to print in color a Web page without any color image, whereby the page is printed in monochrome.

In S604, by obtaining the number of vertical-direction pixels and the number of horizontal-direction pixels, for the file obtained in S603, it is determined whether the number of vertical-direction pixels and the number of horizontal-direction pixels are the number of vertical-direction pixels and the number of horizontal-direction pixels, respectively, that have been set in the detailed-print-setting display in FIG. 8B, or larger. In this regard, if either one of the number of vertical-direction pixels and the number of horizontal-direction pixels is the threshold value or larger, it is determined that the file has the number of pixels that is the threshold value or larger. Additionally, in the case where a "height" attribution and a "width" attribution are set in an image element, the determination is made, based on the attribution values instead of the actual number of pixels of the image file.

If the result of the determination indicates that the either one of the number of vertical-direction pixels and the number of horizontal-direction pixels is the threshold value or larger, the processing proceeds to S605; otherwise, the processing returns to S602.

In S605, it is determined whether the image file to which the image element refers in accordance with a "src" attribution is arranged in the same web site (the place indicated by a URL, i.e., the domain or server is the same) as that for the current Web page. Specifically, if the "src" attribution value is represented in relative notation, it is determined that the image file is in the same web site as that for the current Web page; if the "src" attribution value is represented in absolute notation, the determination is made based on whether or not the address portions are the same. In addition, if the image element is included in an anchor element represented by an <A> tag in HTML, it is also determined whether or not the image file referred to by the "href" attribution of the anchor element is in the same web site.

If the result of the determination indicates that the image file is in the same web site, the processing proceeds to S606; otherwise, the processing returns to S602.

Further, in the monochrome/color determination processing shown in FIG. 6A, the determination of step S604 may be omitted. In this case, if there is a color image linked to the same web site in the Web page, it is set to perform color printing regardless of the size of the color image.

As discussed above, in First Embodiment, by ascertaining whether or not an image element for a color image is in the same web site, it is possible to prevent commercial messages, image elements of which are often arranged in other web sites, and the like from being printed in color.

In S606, a variable "PRINT_MODE" that is utilized for the processing is set to "color" that denotes implementation of color printing; then, the processing ends.

<HTML-Analysis Processing>

Figure 7:
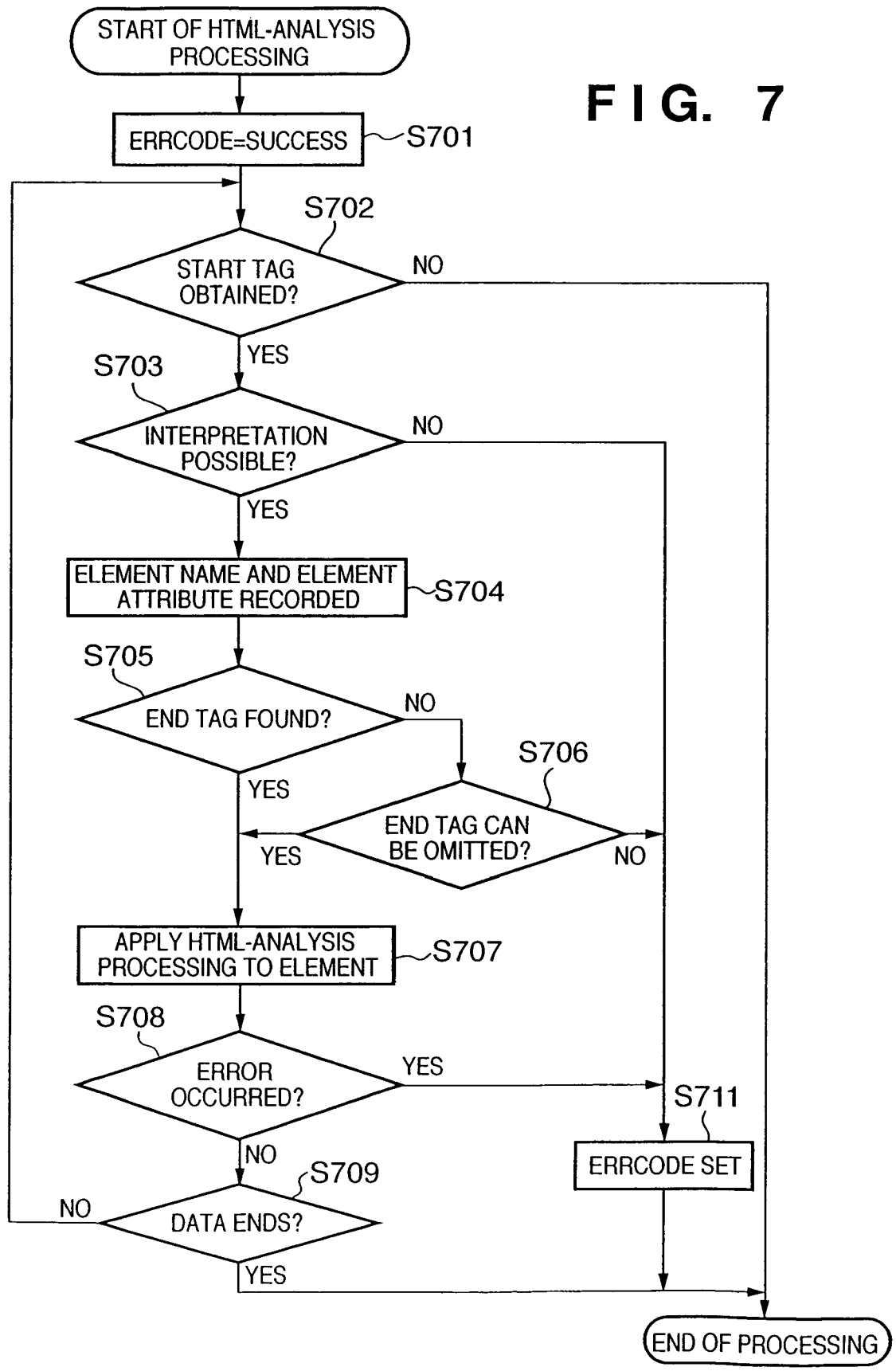
FIG. 7 is a flowchart of HTML-analysis processing for analyzing tag structure in HTML.

FIG. 7 is a flowchart for explaining HTML-analysis processing (S502) for analyzing tag structure in HTML.

In S701, "Success", which indicates no occurrence of error, is substituted for "Errorcode" that is a variable for determining whether or not any error has occurred after processing.

The processing in S702 is to search a start tag in HTML among HTML data. The start tag in HTML can be found by searching a character string starting with "<" and ending with ">". If the start tag is identified, the processing proceeds to S703; otherwise, the processing ends.

In S703, it is determined whether or not the start tag found in S702 is interpretable. It is assumed that, in order to enable this processing, a list of interpretable HTML tags, which is in the format of a table or the like, is preliminarily program-controlled. A list of attributions that can be set as elements and information such as whether or not the end tag can be omitted are also stored in the list of interpretable HTML tags.

If the start tag found in S702 exists in the list of interpretable HTML tags, it is determined that the start tag is interpretable; otherwise, it is determined that the start tag is not interpretable. When the determination indicates that the start tag is interpretable, the processing proceeds to S704; otherwise, the processing proceeds to S711 where an appropriate error code denoting that an HTML tag is not interpretable is substituted for the variable "Errorcode"; then, the processing ends.

The processing in S704 is to store names, attributions, and attribution values, of elements found in S702, in a storage area in a memory device. The storage area is designed to be able to hold a structure on a tree, and information on a single HTML element is to be held in each node in the tree.

In S705, processing of searching the end tag of the HTML element is implemented. If the end tag is not identified, the processing proceeds to S706; otherwise, the processing proceeds to S707.

In S706, referring to the list of interpretable HTML tags, it is determined whether or not the end tag of the subject element can be omitted. When the determination indicates that the end tag can be omitted, the processing proceeds to S707; otherwise, the processing proceeds to S711 where a corresponding error code is substituted for the variable "Errorcode"; then, the processing ends.

In S707, the HTML element is stored in a storage area; in order to analyze sub elements within the stored element, the processing illustrated in FIG. 7 is recursively implemented with regard to the stored element in S707.

In S708, it is ascertained whether or not the processing in S707 has resulted in occurrence of an error. In this situation, if any error is detected, the processing proceeds to S711 where a corresponding error code is substituted for the variable "Errorcode"; then, the processing ends. Meanwhile, in the case where no error has occurred, the processing proceeds to S709

In S709, it is determined whether or not the end of the processing-subject data has been reached. When any portion of processing-subject data is left, the processing returns to S702; otherwise, the processing ends.

As explained heretofore, according to First Embodiment, in printing a Web page with a copy machine, with the color mode being set to "Auto", in the case where the contents of the Web page include an color image, where the data size of the image is the same as a predetermined size or larger, and where the image is arranged in the same web site as that for the Web page, then, the Web page is printed in color; otherwise, the Web page is printed in monochrome.

In consequence, in the case where the Web page does not include any color image, which is considered to be of no advantage to print in color, where the size of a color image is smaller than the predetermined size, or where as a commercial message and the like, a color image is arranged in a web site other than the web site for the Web page, then, color printing is not implemented; therefore, printing costs can be reduced without impairing users' convenience.

Second Embodiment

Various embodiments of the present invention will be explained below. Because the basic configuration and operation of each embodiment described below are the same as those of First Embodiment, explanation therefor will be omitted, and the distinguishing configuration and operation of each embodiment will be mainly explained.

Figure 8C:
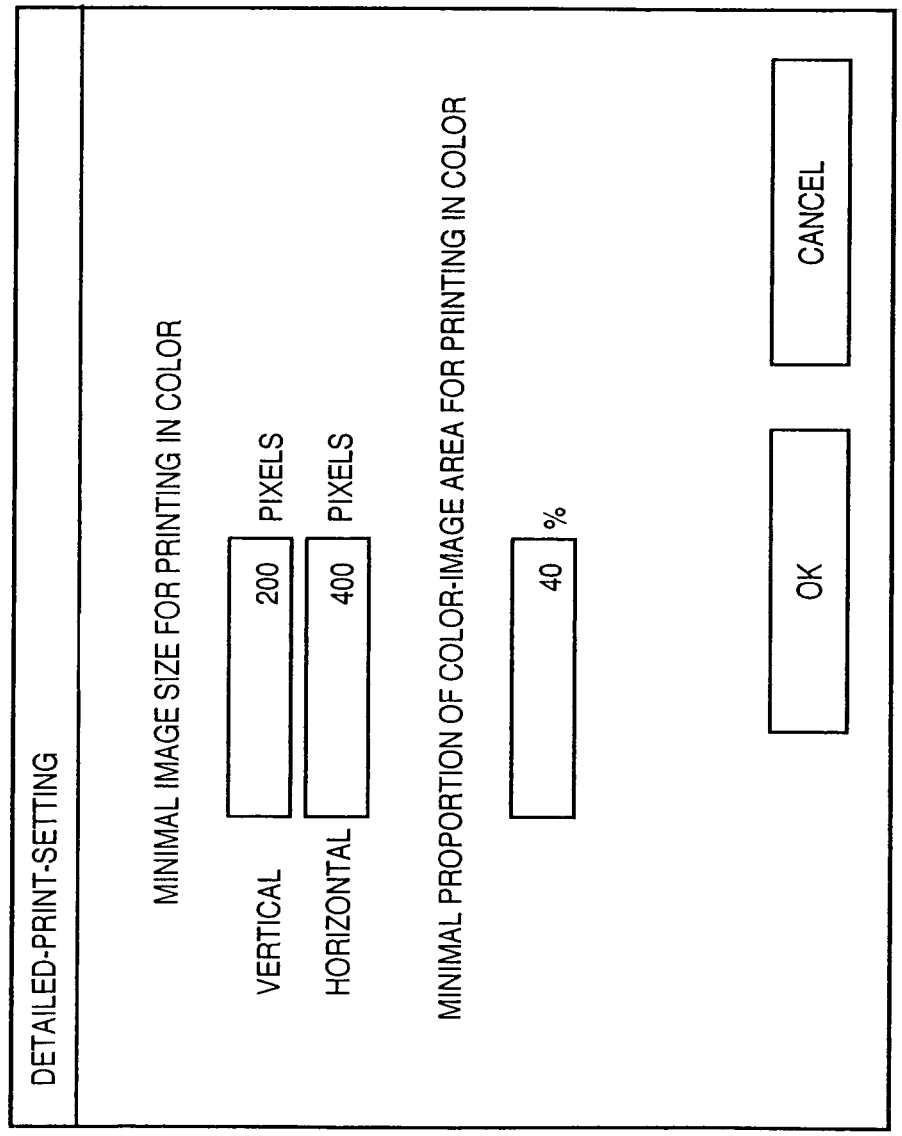
FIG. 8C is a view illustrating an example of a detailed-print-setting display displayed on a operation unit in Second Embodiment.

In First Embodiment described above, as a detailed-print-setting display, the display illustrated in FIG. 8B is displayed, and as color-printing determination processing, processing illustrated in the flowchart in FIG. 6A is implemented; however, in Second Embodiment, as a detailed-print-setting display, a display illustrated in FIG. 8C is displayed, and as color-printing determination processing, processing illustrated in the flowchart in FIG. 6B is implemented In the detailed-print-setting display in FIG. 8C, in addition to the setting items (dialogue boxes) referred to in the explanation for FIG. 8B, the item "minimal proportion of color-image area for color printing" is provided. In this situation, the proportion of color-image area is the proportion of the aggregate area of color images to the area of the entire Web page.

Next, color-printing determination processing, in Second Embodiment, that is illustrated as the flowchart in FIG. 6B will be explained. In this regard, portions, of color-printing determination processing, which are different from the color-printing determination processing in First Embodiment, illustrated in FIG. 6A, will be explained.

In the first place, in S610, the variable "PRINT_MODE" that is utilized for the processing is initialized to "monochrome" that denotes implementation of monochrome printing, and a variable "COLOR_AREA" for storing the area of a color image is initialized to "0".

In S611, the area of an image element that has been determined to be "Yes" in all the steps S602 through S605 is added to the variable "COLOR_AREA". In the case where a "height" attribution and a "width" attribution are specified in an image element, the area that is calculated based on these attribution values is added; in the case where these attribution values are not provided, the area is calculated by means of an image file to be referred to. In some formats of image files, values necessary for calculating the area, such as the number of pixels and resolution, of an image, may be stored as image-attribution information. Such a case as this, the area is calculated from the image-attribution information.

In S612, the proportion of the area stored in the variable "COLOR_AREA" to the area of the entire Web page is calculated; if the proportion of the area is the same as a value, predetermined in the "minimal proportion of color-image area for color printing" in the detailed-print-setting display in FIG. 8C, or larger, the processing proceeds to S606 where the "PRINT_MODE" is set to "color" that denotes implementation of color printing, and then ends; otherwise, the processing directly ends.

In addition, the area of the entire Web page may be determined in accordance with the area of a printing-subject region based on printing data that the controller 2000 has created, based on HTML that describes a printing-subject Web page.

As explained heretofore, according to Second Embodiment, in printing a Web page with a copy machine, with the color mode being set to "Auto", in the case where the contents of the Web page include an color image, where the data size of the image is the same as a predetermined size or larger, and where the proportion of the aggregate area of color images, arranged in the same web site as that for the Web page, to the area of the Web page is the same as a predetermined value or larger, then, the Web page is printed in color; otherwise, the Web page is printed in monochrome.

Accordingly, even though the sizes of several color images are the same as a predetermined size or larger, and the color images are arranged in the same web site, color printing is not implemented as long as the proportion of the aggregate area of the color images to the Web page is less than a predetermined value; therefore, printing costs can further be reduced without impairing users' convenience.

Third Embodiment

In Second Embodiment described above, an example has been explained in which the display illustrated in FIG. 8C is utilized as a detailed-print-setting display. In Third Embodiment, displays illustrated in FIGS. 8D and 8E are utilized as a detailed-print-setting display. Third Embodiment is characterized by enabling setting of a threshold value for each printing-subject web site, by utilizing these detailed-print-setting displays.

FIG. 8D illustrates a detailed-print-setting display that is displayed when the "detailed setting" button 807 in FIG. 8A is depressed.

In the detailed-print-setting display, a URL-list display region 841, and as operation buttons, an "Add" button 842, a "Change" button 843, a "Delete" button 844, and a "Close" button 845 are arranged.

The user can select one or more URLs among URLs displayed in the URL-list display region 841; the URL being selected is displayed, by means of reverse display or the like, in such a way as to be visually distinguished as being selected.

When an "Add" button 842 is depressed, a detailed-print-setting display for each URL, illustrated in FIG. 8E, is displayed. In the initial state, however, a URL-display region 851 is displayed as being blank.

Also in the case where one URL is selected among the URLs displayed in the URL-list display region 841, and the "Change" button 843 is depressed, the detailed-print-setting display illustrated in FIG. 8E is displayed. In this case, however, the URL selected from the URL list is displayed in the URL-display region 851. In addition, it is arranged in such a way that, when a plurality of URLs is selected, the "Change" button cannot be depressed.

When one or more URL are selected among the URLs displayed in the URL-list display region 841, and the "Delete" button 844 is depressed, the selected URL is deleted, and the setting information for the URL is also deleted. Moreover, in Third Embodiment, in preparation against erroneous deletion caused by erroneous depression of the "Delete" button 844, an ascertaining display (unillustrated) is displayed, prior to the actual deletion processing, for ascertaining whether or not the deletion processing may be implemented, whereby the user can cancel the deletion.

In the detailed-print-setting display in FIG. 8E, in addition to the setting items referred to in the explanation for FIG. 8B, the URL-display region 851 is provided; therefore, setting of "Minimal image size for printing in color" and "Minimal proportion of color-image area for printing in color" is possible, in the case where a web site having the URL displayed in the URL-display region 851 is printed.

In addition, the color-printing determination processing in Third Embodiment implements processing, basically in accordance to the flowchart illustrated in FIG. 6B, but differs in that, in determination processing carried out in S604 and S612, comparison is made, based on threshold values for an image size and a proportion of image area, determined for each web site. In Third Embodiment, if the foremost portions of the domains of registered URLs coincide, it is determined that the web sites are identical.

As described above, according to Third Embodiment, it is possible to set site-by-site threshold values for determining whether or not color printing is carried out; therefore, for a web site that is frequently printed, provision is made for color printing to be implemented in accordance with users' desire, whereby printing can be carried out in better accordance with users' intention.

Fourth Embodiment

In Second and Third Embodiments described above, in the color-printing determination processing illustrated in FIG. 6B, whether or not the image size is the same as a threshold value or larger is determined for each image, in S604, and the areas of images having the same size as a threshold value, or larger are aggregated; however, in Fourth Embodiment, regardless of the size of each image, the areas of all images within a Web page are aggregated.

In other words, in Fourth Embodiment, the processing in S604 is not carried out, but the aggregation of the areas of all images within a Web page is obtained; if, in S612, the area proportion is a threshold value or larger, color printing is implemented.

Accordingly, even when a Web page contains a great deal of small-sized color images, color printing is implemented; therefore, printing can be implemented in accordance with visual impression.

Fifth Embodiment

In First to Fourth Embodiments described above, as a "Minimal image size for printing in color", the number of vertical-direction pixels and the number of horizontal-direction pixels are independently set, and detailed-print-setting displays as illustrated in FIGS. 8B, 8C, and 8E are displayed; however, in Fifth Embodiment, as a "Minimal image size for printing in color", the number of pixels of an image is set.

FIG. 8F is a view illustrating an example of a detailed-print-setting display of Fifth Embodiment; In FIG. 8F, a dialogue box 861 is illustrated, to which as a "Minimal image size for printing in color" in the detailed-print-setting display (in FIG. 8E) in Third Embodiment, the number of pixels included in an image is inputted. The dialogue boxes in the detailed-print-setting displays illustrated in FIGS. 8B and 8C may be modified as is in FIG. 8F.

Of course, also in the color-printing determination processing illustrated in FIGS. 6A and 6B, determination is implemented in the determination processing in S604, by comparing the number of pixels included in an image with a threshold-value number of pixels.

Accordingly, for example, even though the shape of an image is not a common shape such as a quadrangular form or a circular form, but is a shape having a solely protruding portion, printing can be implemented in accordance with a visual impression.

Sixth Embodiment

In Third Embodiment described above, it is possible to set a threshold value, for each web site, for determining whether or not color printing is implemented; however, in Sixth Embodiment, it is possible to set for each web site a printing mode.

In other words, in Sixth Embodiment, it is possible to set, as a printing mode for each web site, one out of "Auto", "Monochrome", and "Color".

FIG. 8G is a view illustrating an example of a detailed-print-setting display of Sixth Embodiment; in this detailed-print-setting display, a region 871 for specifying a printing mode is provided in addition to the detailed-print-setting display illustrated in FIG. 8F, of Fifth Embodiment. In a detailed-print-setting display such as this, it is possible to select and set one out of "Auto", "Monochrome", and "Color", as a printing mode for each displayed URL.

In Sixth Embodiment, the detailed-print-setting display is configured in such a way that, only when "Auto" is selected as a printing mode, setting (inputting) of values to the dialogue boxes for "Minimal image size for printing in color" and "Minimal proportion of color-image area for printing in color" is enabled, and that, when "Monochrome" or "Color" is selected, setting of values to these dialogue boxes is not enabled.

In Sixth Embodiment, in the processing for creating printing data from a Web page, prior to processing in S501 in the flowchart illustrated in FIG. 5, it is determined whether or not the URL of a printing-subject Web page is a subject of detailed setting for printing, i.e., whether or not the URL has been set (is displayed) in the URL-list display region 841 in FIG. 8D; if such is the case, the printing mode for the URL is checked; the processing is ramified in such a way that, if the printing mode is "Monochrome", the processing proceeds to S505, and if "Color", to S506, while neglecting the setting of the dialogue box 803 for color mode, in FIG. 8A.

In contrast, if the URL of a printing-subject Web page is not a subject of detailed setting for printing, processing in and after S501 is carried out in accordance with the setting in the color-mode dialogue box 803 in FIG. 8A.

As described heretofore, according to Sixth Embodiment, it is possible to set a printing mode for each web site; therefore, for a web site that is frequently printed, provision is made for color printing to be implemented in accordance with users' desire, whereby printing can be carried out in better accordance with users' intention.

Other Embodiments

The present invention can be applied to an image forming system comprising a plurality of devices or to an image forming apparatus comprising a single device.

Furthermore, the invention can be implemented by supplying a software program, which implements the functions of the foregoing embodiments (program corresponding to flowchart(s) shown in FIGS. 5, 6A, 6B and/or 7), directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a web site on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different web sites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a web site via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-229769, filed Aug. 5, 2004, which is hereby incorporated by reference.

What is claimed is:

1. An image forming apparatus enabling communication through a network and having a monochrome-printing mode and a color-printing mode, the image forming apparatus comprising:
   an obtaining unit adapted to obtain Web page data described in a markup language from a Web site via the network, and to obtain a plurality of images referred to by the Web page data from the Web site or other Web sites via the network;
   a display unit adapted to display a Web page based on the Web page data and the plurality of images obtained by said obtaining unit;
   a first determining unit adapted to determine whether the plurality of images obtained by said obtaining unit include a color image obtained from the Web site; and
   a setting unit adapted to
      automatically set a printing mode for printing the displayed Web page to the color-printing mode if said first determining unit determines that the plurality of images obtained by said obtaining unit include a color image obtained from the Web site, and
      automatically set the printing mode for printing the displayed Web page to the monochrome-printing mode if said first determining unit determines that the plurality of images obtained by said obtaining unit do not include any color image obtained from the Web site, even if those images include a color image obtained from another Web site.

2. The image forming apparatus according to claim 1, wherein an image referred to by the Web page data can be obtained from the Web site when the referring URL corresponds to the same domain as the Web site or the same server as the Web site.

3. The image forming apparatus according to claim 1, further comprising:
   a second determining unit adapted to determine whether or not a size of the color image is a predetermined setting value or larger; and
   a control unit adapted to remove, when said first determining unit determines that the plurality of images obtained by said obtaining unit include a color image obtained from the Web site and the second determining unit determines that the size of the color image is not the predetermined setting value or larger, the color image from consideration by said setting unit in setting the printing mode.

4. The image forming apparatus according to claim 3, wherein said second determining unit determines if at least one of a horizontal size and a vertical size of the color image is the predetermined setting value or larger.

5. The image forming apparatus according to claim 3, wherein said second determining unit determines if at least one of the number of vertical-direction pixels and the number of horizontal-direction pixels of the color image is the predetermined setting value or larger.

6. The image forming apparatus according to claim 3, wherein said second determining unit determines whether an area of the color image is the predetermined setting value or larger.

7. The image forming apparatus according to claim 3, wherein the predetermined setting value can be changed for each Web site.

8. The image forming apparatus according to claim 1, wherein the image forming apparatus is a multi-function peripheral having a copy function, a scanner function, and a facsimile function.

9. The image forming apparatus according to claim 1, wherein said obtaining unit obtains, as the plurality of images, elements indicated by image attributes within the Web page data.

10. The image forming apparatus according to claim 1, further comprising:
   a third determining unit adapted to determine whether a ratio of an area of the color image to an area of the Web page data is a second predetermined setting value or larger,
   wherein if said first determining unit determines that the plurality of images obtained by said obtaining unit include a color image obtained from the Web site and said third determining unit determines that the ratio is not the second predetermined setting value or larger, said setting unit sets the printing mode for the displayed Web page to the monochrome printing mode.

11. A printing-mode setting method for an image forming apparatus enabling communication through a network and having a monochrome-printing mode and color-printing mode, the printing-mode setting method comprising:
   an obtaining step of obtaining Web page data described in a markup language from a Web site via the network, and obtaining a plurality of images referred to by the Web page data from the Web site or different Web sites via the network;
   a display step adapted to display a Web page based on the Web page data and the plurality of images obtained in said obtaining step;
   a first determining step of determining whether the plurality of images obtained in said obtaining step include a color image obtained from the Web site; and
   a setting step of
      automatically setting a printing mode for printing the displayed Web page to the color-printing mode if in said first determining step, it is determined that the plurality of images obtained in said obtaining step include a color image obtained from the Web site, and
      automatically setting the printing mode for printing the displayed Web page to the monochrome-printing mode if in said first determining step, it is determined that the plurality of images obtained in said obtaining step do not include any color image obtained from the Web site, even if those images include a color image obtained from another Web site.

12. A non-transitory, computer-readable storage medium storing a computer program for making a computer carry out a printing-mode setting method for an image forming apparatus enabling communication through a network and having a monochrome-printing mode and a color-printing mode, the method comprising:
   an obtaining step of obtaining Web page data described in a markup language from a Web site via the network, and obtaining a plurality of images referred to by the Web page data from the Web site or other web sites via the network;
   a display step of displaying a Web page based on the Web page data and the plurality of images obtained in said obtaining step;
   a first determining step of determining whether the plurality of images obtained in said obtaining step include a color image obtained from the Web site; and
   a setting step of
      automatically setting a printing mode for printing the displayed Web page to the color-printing mode if in said first determining step, it is determined that the plurality of images obtained in said obtaining step include a color image obtained from the Web site, and automatically setting the printing mode for printing the displayed Web page to the monochrome-printing mode if in said first determining step, it is determined that the plurality of images obtained in said obtaining step do not include any color image obtained from the Web site, even if those images include a color image obtained from another Web site.

13. A printer driver, installed in a computer enabling communication through a network and having a display and a browser for making the display for a Web page, for outputting control data and image data to an image forming apparatus that enables monochrome printing and color printing, the printer driver making the computer carry out:

an obtaining step of obtaining Web page data described in a markup language from a Web site via the network, and obtaining a plurality of images referred to by the Web page data from the Web site or other web sites via the network;

a display step of displaying a Web page based on the Web page data and the plurality of images obtained in said obtaining step;

a first determining step of determining whether the plurality of images obtained in said obtaining step include a color image obtained from the Web site; and a setting step of automatically setting a printing mode for printing the displayed Web page to the color-printing mode if in said first determining step, it is determined that the plurality of images obtained in said obtaining step include a color image obtained from the Web site, and automatically setting the printing mode for printing the displayed Web page to the monochrome-printing mode if in said first determining step, it is determined that the plurality of images obtained in said obtaining step do not include any color image obtained from the Web site, even if those images include a color image obtained from another Web site.

\* \* \* \* \*